(12) United States Patent
Moriguchi et al.

(10) Patent No.: US 10,691,400 B2
(45) Date of Patent: Jun. 23, 2020

(54) INFORMATION MANAGEMENT SYSTEM AND INFORMATION MANAGEMENT METHOD

(71) Applicant: YAMAHA CORPORATION, Hamamatsu-shi (JP)

(72) Inventors: Shota Moriguchi, Tokyo (JP); Takahiro Iwata, Tokyo (JP); Yuki Seto, Tokyo (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/327,735

(22) PCT Filed: Jul. 27, 2015

(86) PCT No.: PCT/JP2015/071236
§ 371 (c)(1),
(2) Date: Jan. 20, 2017

(87) PCT Pub. No.: WO2016/017576
PCT Pub. Date: Feb. 4, 2016

(65) Prior Publication Data
US 2017/0212720 A1    Jul. 27, 2017

(30) Foreign Application Priority Data

Jul. 29, 2014  (JP) ................................. 2014-154117
Oct. 24, 2014  (JP) ................................. 2014-217345
Apr. 28, 2015  (JP) ................................. 2015-092284

(51) Int. Cl.
*G06F 40/30*    (2020.01)
*G06F 40/58*    (2020.01)
(Continued)

(52) U.S. Cl.
CPC ............... *G06F 3/16* (2013.01); *G06F 40/47* (2020.01); *G06F 40/58* (2020.01); *G10L 13/08* (2013.01); *G10L 19/018* (2013.01)

(58) Field of Classification Search
CPC .. G06F 17/28; G06F 17/2809; G06F 17/2818; G06F 17/2827; G06F 17/2836;
(Continued)

(56) References Cited

U.S. PATENT DOCUMENTS 3,263,207 A    7/1966  Kroamer et al.
5,615,301 A *  3/1997  Rivers .................... G10L 15/26
                                                         704/277
(Continued)

FOREIGN PATENT DOCUMENTS

CN    1494714 A    5/2004
CN    101490739 A  7/2009
(Continued)

OTHER PUBLICATIONS

International Search Report issued in Intl. Appln. No. PCT/JP2015/071237 dated Aug. 18, 2015. English translation provided.
(Continued)

*Primary Examiner* — Lamont M Spooner
(74) *Attorney, Agent, or Firm* — Rossi, Kimms & McDowell LLP

(57) ABSTRACT

An information management system includes: an audio signal acquisitor configured to acquire an audio signal representing a guide voice; a related information acquisitor configured to acquire related information that is related to the guide voice; an association manager configured to associate the related information acquired by the related information acquisitor for the guide voice with identification information that is notified to a terminal device upon emission of the guide voice corresponding to the audio signal;
(Continued)

and an information provider configured to receive from the terminal device an information request including the identification information notified to the terminal device and to transmit to the terminal device the related information associated by the association manager with the identification information.

11 Claims, 8 Drawing Sheets

(51) Int. Cl.
  *G06F 3/16* (2006.01)
  *G06F 40/47* (2020.01)
  *G10L 19/018* (2013.01)
  *G10L 13/08* (2013.01)

(58) Field of Classification Search
  CPC ............ G06F 17/2845; G06F 17/2854; G06F 17/2863; G06F 17/2872; G06F 17/289; G06F 17/2881; G10L 13/00; G10L 13/086
  USPC ................................. 704/1, 2, 8, 9, 257, 258
  See application file for complete search history.

(56) References Cited

U.S. PATENT DOCUMENTS

| | | | |
|---|---|---|---|
| 6,542,200 B1* | 4/2003 | Barcy | H04N 5/44513 348/468 |
| 6,546,365 B1* | 4/2003 | Gajda | G06F 9/454 704/8 |
| 7,415,407 B2 | 8/2008 | Naruse | |
| 7,505,823 B1 | 3/2009 | Bartlett et al. | |
| 7,513,414 B1* | 4/2009 | Block | G06Q 20/1085 235/379 |
| 7,957,977 B2 | 6/2011 | Zhao et al. | |
| 8,462,950 B2 | 6/2013 | Jacobs | |
| 8,676,273 B1* | 3/2014 | Fujisaki | H04M 1/6505 455/567 |
| 8,965,547 B2 | 2/2015 | Wabnik | |
| 8,989,883 B2* | 3/2015 | Shah | G10L 19/018 700/94 |
| 9,331,778 B2 | 5/2016 | Iizuka et al. | |
| 9,699,332 B2 | 7/2017 | Kono | |
| 9,767,796 B2* | 9/2017 | Zhang | G10L 15/22 |
| 9,858,339 B2 | 1/2018 | Akiyama et al. | |
| 2001/0055391 A1 | 12/2001 | Jacobs | |
| 2002/0032037 A1 | 3/2002 | Segawa | |
| 2002/0111141 A1 | 8/2002 | Furukawa | |
| 2003/0212465 A1* | 11/2003 | Howard | G05B 19/042 700/94 |
| 2004/0220995 A1 | 11/2004 | Tsutsumi | |
| 2005/0192095 A1* | 9/2005 | Cheng | G06F 9/454 463/35 |
| 2006/0074624 A1* | 4/2006 | Sahashi | H04M 3/567 704/8 |
| 2007/0225897 A1* | 9/2007 | Enmei | G06F 1/1616 358/1.15 |
| 2008/0015860 A1* | 1/2008 | Lane | G10L 13/047 704/258 |
| 2008/0027734 A1 | 1/2008 | Zhao et al. | |
| 2008/0140422 A1* | 6/2008 | Hovestadt | G10L 15/26 704/275 |
| 2008/0153540 A1 | 6/2008 | Brown | |
| 2009/0012788 A1* | 1/2009 | Gilbert | G09B 21/009 704/235 |
| 2009/0074240 A1* | 3/2009 | Srinivasan | G10L 19/018 382/100 |
| 2009/0233582 A1 | 9/2009 | Suzuki et al. | |
| 2010/0222000 A1* | 9/2010 | Sauer | G06F 9/451 455/41.2 |
| 2010/0225808 A1 | 9/2010 | Mears | |
| 2010/0245581 A1 | 9/2010 | Koyama et al. | |
| 2011/0150240 A1 | 6/2011 | Akiyama et al. | |
| 2012/0069131 A1* | 3/2012 | Abelow | G06Q 10/067 348/14.01 |
| 2012/0102409 A1* | 4/2012 | Fan | H04W 4/00 715/738 |
| 2012/0143612 A1* | 6/2012 | Yu | H04N 21/4126 704/500 |
| 2012/0214416 A1 | 8/2012 | Kent et al. | |
| 2012/0253814 A1* | 10/2012 | Wang | G06F 16/9577 704/260 |
| 2012/0303147 A1 | 11/2012 | Shah et al. | |
| 2013/0144595 A1 | 6/2013 | Lord et al. | |
| 2013/0204623 A1 | 8/2013 | Suzuki et al. | |
| 2014/0120503 A1* | 5/2014 | Nicol | G09B 5/02 434/157 |
| 2014/0142958 A1 | 5/2014 | Sharma et al. | |
| 2014/0188478 A1* | 7/2014 | Zhang | G10L 15/22 704/257 |
| 2014/0242955 A1* | 8/2014 | Kang | H04W 4/18 455/414.1 |
| 2014/0254801 A1* | 9/2014 | Srinivasan | G10L 19/008 381/17 |
| 2014/0269678 A1* | 9/2014 | McGee | G06F 40/58 370/352 |
| 2014/0289323 A1* | 9/2014 | Kutaragi | G06Q 50/01 709/203 |
| 2014/0318348 A1 | 10/2014 | Tsunoo et al. | |
| 2015/0036464 A1 | 2/2015 | Moriguchi | |
| 2015/0149146 A1* | 5/2015 | Abramovitz | G06F 40/58 704/2 |
| 2015/0154183 A1* | 6/2015 | Kristjansson | H04M 3/56 704/3 |
| 2015/0347399 A1* | 12/2015 | Aue | H04M 3/42 704/2 |
| 2015/0350451 A1* | 12/2015 | Aue | H04M 3/42 379/202.01 |
| 2016/0066032 A1* | 3/2016 | Grant | H04N 21/23418 725/19 |
| 2016/0170970 A1* | 6/2016 | Lindblom | G06F 40/40 704/3 |
| 2017/0245069 A1 | 8/2017 | Moriguchi et al. | |
| 2018/0098164 A1 | 4/2018 | Moriguchi et al. | |
| 2018/0314689 A1* | 11/2018 | Wang | G06F 40/58 |

FOREIGN PATENT DOCUMENTS

| | | |
|---|---|---|
| CN | 103049229 A | 4/2013 |
| CN | 203136168 U | 8/2013 |
| CN | 103650519 A | 3/2014 |
| CN | 103945108 A | 7/2014 |
| EP | 1457971 A1 | 9/2004 |
| GB | 2460306 A | 12/2009 |
| JP | S61-116400 U1 | 7/1986 |
| JP | H02190888 A | 7/1990 |
| JP | H08-008855 A | 1/1996 |
| JP | H08079199 A | 3/1996 |
| JP | H09018394 A | 1/1997 |
| JP | H10174190 A | 6/1998 |
| JP | H1115827 A | 1/1999 |
| JP | H11252121 A | 9/1999 |
| JP | H11331462 A | 11/1999 |
| JP | 2000207170 A | 7/2000 |
| JP | 2002092236 A | 3/2002 |
| JP | 2002217839 A | 8/2002 |
| JP | 2002259612 A | 9/2002 |
| JP | 2003506918 A | 2/2003 |
| JP | 2003536094 A | 12/2003 |
| JP | 2006092740 A | 4/2006 |
| JP | 3822224 B1 | 9/2006 |
| JP | 2006251676 A | 9/2006 |
| JP | 2007121626 A | 5/2007 |
| JP | 2007164659 A | 6/2007 |
| JP | 2008192109 A | 8/2008 |
| JP | 2008299032 A | 12/2008 |
| JP | 2009180893 A | 8/2009 |
| JP | 2009205485 A | 9/2009 |

(56) References Cited

FOREIGN PATENT DOCUMENTS

| | | |
|---|---|---|
| JP | 2010011282 A | 1/2010 |
| JP | 2010072641 A | 4/2010 |
| JP | 2010276950 A | 12/2010 |
| JP | 2010284423 A | 12/2010 |
| JP | 2011109629 A | 6/2011 |
| JP | 2011255982 A | 12/2011 |
| JP | 2012227921 A | 11/2012 |
| JP | 2013005377 A | 1/2013 |
| JP | 2013008109 A | 1/2013 |
| JP | 2013068657 A | 4/2013 |
| JP | 2013068900 A | 4/2013 |
| JP | 2013117688 A | 6/2013 |
| JP | 2013125047 A | 6/2013 |
| JP | 2013520693 A | 6/2013 |
| JP | 2013178510 A | 9/2013 |
| JP | 2008058953 A | 3/2018 |
| KR | 101288305 B1 | 8/2013 |
| WO | 0076154 A1 | 12/2000 |
| WO | 0182554 A2 | 11/2001 |
| WO | 2010016589 A1 | 2/2010 |
| WO | 2012116213 A1 | 8/2012 |
| WO | 2014129370 A1 | 8/2014 |

OTHER PUBLICATIONS

International Search Report issued in Intl. Appln. No. PCT/JP2015/071236 dated Aug. 25, 2015. English translation provided.
Written Opinion issued in Intl. Appln. No. PCT/JP2015/071236 dated Aug. 25, 2015.
Written Opinion issued in Intl. Appln. No. PCT/JP2015/071237 dated Aug. 18, 2015.
Copending U.S. Appl. No. 15/327,753, filed Jan. 20, 2017.
Office Action issued in Australian Appln. No. 2015297647 dated Mar. 14, 2017.
Office Action issued in Australian Appln. No. 2015297648 dated Mar. 14, 2017.
Office Action issued in Korean Appln. No. 10-2017-7005253 dated May 11, 2017. English translation provided.
Office Action issued in Korean Appln. No. 10-2017-7005255 dated May 11, 2017. English translation provided.
Extended European Search Report issued in European Appln. No. 15828167.5 dated Nov. 10, 2017.
Office Action issued in Japanese Appln. No. 2017-103875 dated Dec. 12, 2017. English translation provided.
Office Action issued in Japanese Appln. No. 2017-103876 dated Jun. 6, 2017. English machine translation provided.
Extended European Search Report issued in European Application No. 15835023.1 dated Apr. 5, 2018.
Extended European Search Report issued in European Application No. 17205390.2 dated Mar. 26, 2018.
Office Action issued in U.S. Appl. No. 15/327,753 dated Feb. 23, 2018.
International Search Report issued in International Patent Application No. PCT/JP2015/073400 dated Oct. 6, 2015. Cited in U.S. Publication Nos. 1 and 2.
Written Opinion issued in International Patent Application No. PCT/JP2015/073400 dated Oct. 6, 2015. Cited in U.S. Publication Nos. 1 and 2.
Office Action issued in Japanese Application No. 2017-152039 dated Aug. 29, 2017. English translation provided. Cited in U.S. Publication Nos. 1 and 2.
Office Action issued in U.S. Appl. No. 15/830,367 dated Mar. 22, 2018. Cited in U.S. Publication No. 1.
Office Action issued in U.S. Appl. No. 15/503,500 dated Apr. 19, 2018. Cited in U.S. Publication No. 2.
Extended European Search Report issued in European Appln. No. 15827950.5 dated Feb. 26, 2018.
Office Action issued in Korean Application No. 10-2017-7031874 dated Jul. 6, 2018. English translation provided.
Office Action issued in Korean Application No. 10-2017-7031865 dated Jul. 6, 2018. English translation provided.
Office Action issued in Japanese Appln. No. 2014-171320 dated Jul. 31, 2018. English machine translation provided.
Office Action issued in U.S. Appl. No. 15/327,753 dated Aug. 10, 2018.
Office Action issued in Japanese Appln. No. 2017-187576 dated Aug. 21, 2018. English Translation provided.
Office Action issued in U.S. Appl. No. 15/830,367 dated Oct. 19, 2018.
Office Action issued in Korean Appln. No. 10-2017-7031865 dated Sep. 10, 2018. English Translation provided.
Advisory Action issued in U.S. Appl. No. 15/327,753 dated Nov. 9, 2018.
Office Action issued in U.S. Appl. No. 15/503,500 dated Nov. 19, 2018.
Office Action issued in Korean Appln. No. 10-2017-7031874 dated Oct. 19, 2018. English Translation provided.
Choi et al., "Mobile-Based RFID System for Efficient Service of Cultural Assets Information in Ubiquitous Environment," Journal of The Korean Society for Computer Game, No. 8. Jun. 2006: 1-20. English Translation provided. Cited in NPL 6.
Statement of Opposition against Japanese Patent No. 6231244 filed on May 15, 2018. English Translation provided.
"Report of development and study of information distribution system using acoustic watermark technology." New Media Development Association. Mar. 19, 2010: 1-132. Partial English Translation Provided. Cited in NPL 8 and 11.
"Development of information compensation system for the disabled using electronic watermark technology—for barrier-free acoustic information." National Institute of Special Needs Education. Mar. 2007: 1-103. Partial English Translation Provided. Cited in NPL 8 and 11.
Notice of Reasons for Revocation for Japanese Patent No. 6231244 dated Oct. 19, 2018. English Translation provided.
Office Action issued in European Patent Application No. 15828167.5 dated Nov. 30, 2018.
Office Action issued in Chinese Application No. 201580040546.2 dated Mar. 14, 2019. English translation provided.
Press materials of The Ministry of Internal Affairs and Communications, "Study meeting on the way of instantaneous information transmission by sirens, etc. Report, field test results and standard specifications, Mar. 27, 2006, Fire Department." Concise explanation of relevance provided in the attached English translation of pp. 38-41 of the Determination of an Opposition issued in Japanese Patent No. 6231244, which was previously cited in an IDS on May 21, 2019.
Office Action issued in U.S. Appl. No. 15/830,367 dated May 10, 2019.
Office Action issued in Japanese Application No. 2016-074650 dated Mar. 19, 2019. English translation provided.
Office Action issued in Japanese Application No. 2016-074651 dated Mar. 26, 2019. English translation provided.
Summons to Attend Oral Proceedings issued in European Application No. 15828167.5 dated Apr. 8, 2019.
Determination of an Opposition issued in Japanese Patent No. 6231244 dated Apr. 12, 2019. English translation provided.
Office Action issued in U.S. Appl. No. 15/327,753 dated Feb. 7, 2019.
Office Action issued in European Appln. No. 15827950.5 dated Feb. 7, 2019.
Office Action issued in Korean Appln No. 10-2017-7031874 dated Jan. 4, 2019. English Translation provided.
Office Action issued in Chinese Application No. 201580045711.3 dated Sep. 19, 2019. English translation provided.
Office Action issued in Japanese Appln. No. 2019-082771 dated Mar. 3, 2020. English machine translation provided.
Final Office Action issued in U.S. Appl. No. 15/327,753 dated Jul. 10, 2019.
Office Action issued in Chinese Application No. 201580040538.8 dated Mar. 25, 2019. English translation provided.

(56) References Cited

OTHER PUBLICATIONS

Office Action issued in Chinese Application No. 201580040546.2 dated Aug. 16, 2019. English translation provided.

* cited by examiner

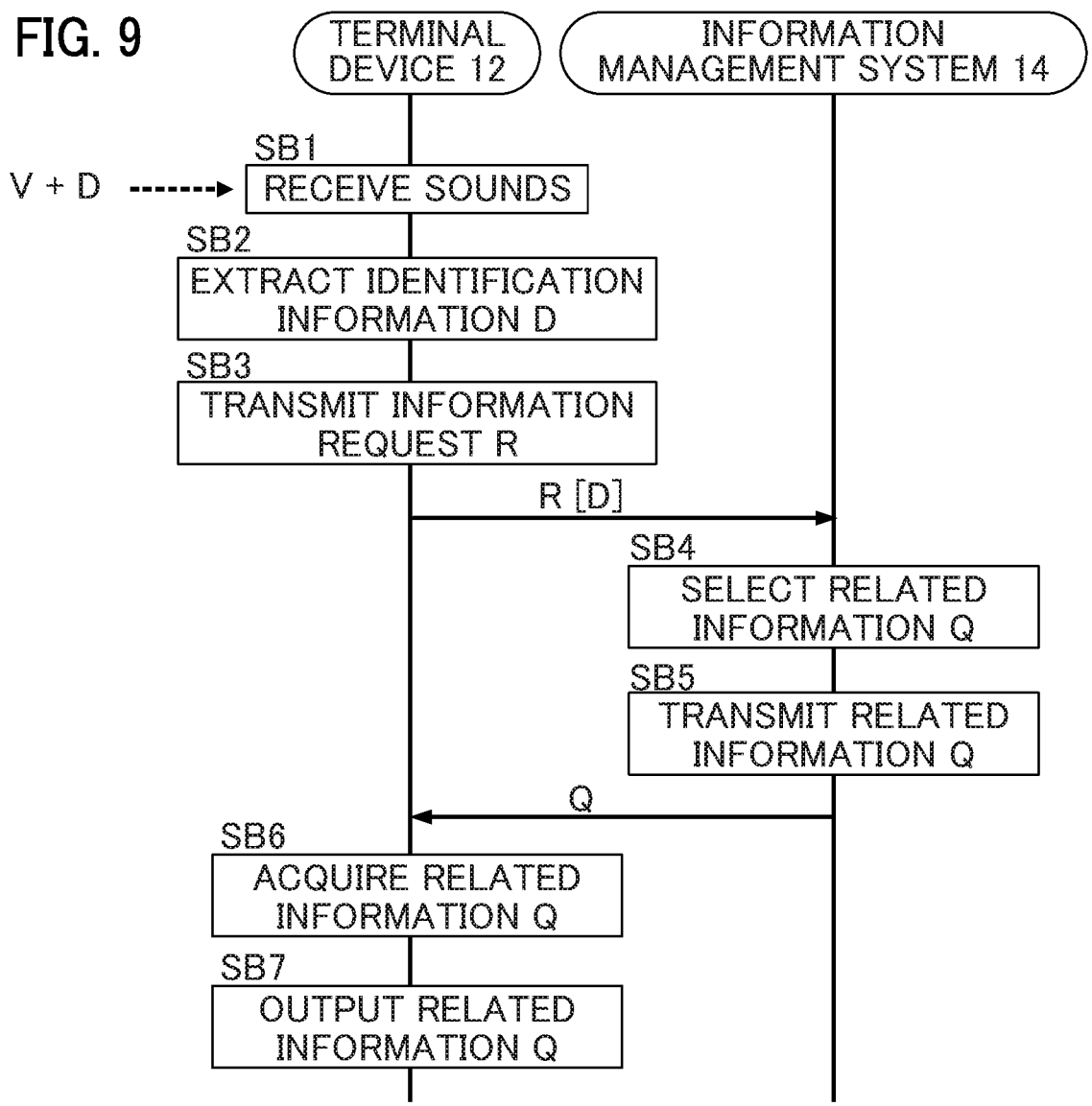
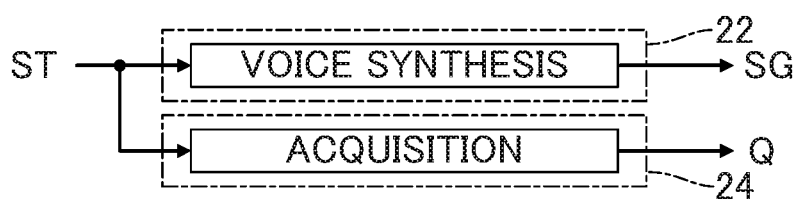
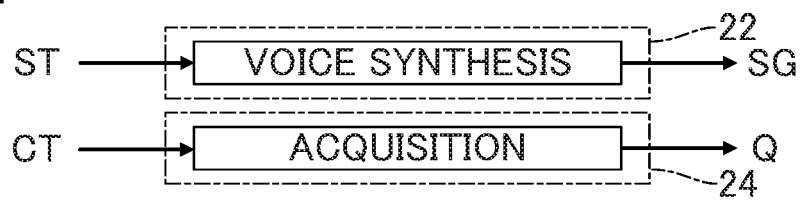

INFORMATION MANAGEMENT SYSTEM AND INFORMATION MANAGEMENT METHOD

TECHNICAL FIELD

The present invention relates to a technology for providing information to a user of a terminal device.

BACKGROUND ART

Various technologies have been proposed to act as guides for visitors in an exhibition facility such as a gallery and a museum. For example, Patent Document 1 discloses a personal guide system that consists of a portable reproducing unit carried by a visitor. In the reproducing unit there are stored in advance audio commentaries, and the reproducing unit reproduces each commentary in response to a corresponding piece of code information transmitted from a transmitting means proximate to an exhibit. Similarly, Patent Document 2 discloses a guidance method, wherein from among various pieces of exhibit data (e.g., explanatory images and voices about exhibits) stored in advance in a portable transceiving unit that is carried by a visitor in an exhibition facility, there is selected a piece of exhibit data corresponding to an identification signal transmitted from a fixed transceiving means located proximate to each exhibit, and from the selected piece of data there are reproduced explanatory images and voices about the exhibit.

RELATED ART DOCUMENT

Patent Documents

Patent Document 1: Japanese Patent Application Laid-Open Publication No. H02-190888
Patent Document 2: Japanese Patent Application Laid-Open Publication No. 2002-259612

SUMMARY OF THE INVENTION

Problem to be Solved by the Invention

In the techniques disclosed in Patent Documents 1 and 2, information stored in advance in a portable terminal device carried by a user (a reproducing unit in Patent Document 1 or a portable transceiving unit in Patent Document 2) is selectively reproduced. Accordingly, these arts are subject to a drawback in that the terminal device is required to have a large storage capacity. In the above description, an exhibition facility such as a gallery or a museum is given as an example. However, a problem similar to that described above with regard to storage capacity would arise in any situation in which a variety of information is provided to users, such as, for example, in the case of voice guidance in a transport system, such as a train or a bus. In view of the stated problem, it is an object of the present invention to enable a variety of information to be provided to a user, while also enabling a required storage capacity of a terminal device to be reduced compared with the prior art.

Means of Solving the Problems

In order to solve the stated problem, an information management system according to the present invention includes: an audio signal acquisition means configured to acquire an audio signal representing a sound for reproduction; a related information acquisition means configured to acquire a piece of related information that is related to the sound for reproduction; an association management means configured to associate the piece of related information acquired by the related information acquisition means for the sound for reproduction with a piece of identification information that is notified to a terminal device upon emission of the sound for reproduction corresponding to the audio signal; and an information providing means configured to receive from the terminal device an information request including the piece of identification information notified to the terminal device and to transmit to the terminal device the piece of related information associated by the association management means with the piece of identification information. In the above configuration, the identification information, which is notified to the terminal device upon emission of the sound for reproduction, and the related information, which is related to the sound for reproduction, are associated with each other, and the related information corresponding to the identification information notified to the terminal device is provided to the terminal device. Compared with the techniques disclosed in Patent Documents 1 and 2, therefore, an advantage is obtained in that a required storage capacity for the terminal device to store related information can be reduced.

In a preferred mode of the present invention, the information management system further includes a signal processing means configured to generate an audio signal that includes the audio signal acquired by the audio signal acquisition means and a modulated signal that includes the piece of identification information. In the above mode, since an audio signal is generated in which the audio signal of the sound for reproduction and the modulated signal including the piece of identification information of the sound for reproduction are included, the piece of identification information can be notified to the terminal device upon emission of a sound corresponding to the generated audio signal. Thus, an advantage is obtained in that identification information can be transmitted and received by use of a simple configuration utilizing components that are capable of emitting and receiving sound.

In a preferred mode of the present invention, the signal processing means adds modulated signals that include pieces of identification information to reproduction sections that are time-axis divided sections of the audio signal acquired by the audio signal acquisition means, wherein the pieces of identification information in the modulated signals are different from one another between the reproduction sections. The association management means associates a piece of related information that is acquired by the related information acquisition means for each reproduction section with a piece of identification information that corresponds to the reproduction section. In the above mode, the sound for reproduction is divided into reproduction sections, and in each reproduction section a modulated signal having a different piece of identification information is included. Furthermore, for each reproduction section, the piece of identification information is associated with the corresponding piece of related information. By this configuration, a piece of related information that is transmitted to the terminal device can be changed in conjunction with progression in the emission of the sound for reproduction.

In a preferred mode of the present invention, the audio signal acquisition means generates the audio signal indicative of the sound for reproduction by voice synthesis, the sound for reproduction being a spoken rendition of a character string that accords with an instruction from a user. In the above mode, since the audio signal indicative of the sound for reproduction is generated by voice synthesis, an advantage is obtained in that the sound for reproduction need not be recorded in advance. In a preferred mode of the present invention, the related information acquisition means generates the piece of related information indicative of a translation of the sound for reproduction by machine translation of a character string indicative of a spoken content of the sound for reproduction. In the above mode, the related information is generated by machine translation of the character string indicative of the spoken content of the sound for reproduction. Thus, an advantage is obtained in that there is no need to prepare in advance related information in a language different from the language of the sound for reproduction. A manner in which the audio signal acquisition means acquires audio signals, and a manner in which the related information acquisition means acquires related information can be freely chosen. For example, a configuration can be employed in which the audio signal acquisition means acquires an audio signal of a sound for reproduction from a signal supply device that outputs audio signals. Alternatively or additionally, a configuration can be employed in which the related information acquisition means acquires related information indicative of an image related to a sound for reproduction.

In a preferred mode of the present invention, the related information acquisition means generates, by machine translation of a character string indicative of a spoken content of the sound for reproduction, a character string indicative of a translation of the sound for reproduction and further generates, as the piece of related information and by voice synthesis, an audio signal indicative of a spoken rendition of the character string indicative of the translation, the audio signal thus being indicative of the translation of the sound for reproduction. In the above mode, the character string indicative of the translation of the sound for reproduction is generated by machine translation, and the audio signal, which is a spoken rendition of the character string indicative of the translation and is indicative of the sound for reproduction, is generated as the related information by voice synthesis. Accordingly, in parallel with the emission of the sound for reproduction, which is in a first language, the terminal device reproduces the sound for reproduction in a second language that is different from the original language of the sound for reproduction (first language). Thus, an advantage is obtained in that even when a user of the terminal device is unable to understand the sound for reproduction in the first language, the user is able to understand the reproduced content by listening to the sound for reproduction in the second language.

In a preferred mode of the present invention, the related information acquisition means acquires an image related to the sound for reproduction as the piece of related information. In this configuration, the image related to the sound for reproduction is acquired as the related information. Thus, an advantage is obtained in that there is no need for the image related to the sound for reproduction to be stored in advance in the terminal device. A large amount of the storage capacity of a terminal device 12 is taken up when image data with large data sizes are stored thereon. In the present invention, the storage capacity required of a terminal device to store images related to sounds for reproduction can be substantially reduced.

In a preferred mode of the present invention, the audio signal acquisition means acquires the audio signal indicative of the sound for reproduction, the audio signal being supplied from a signal supply device, and the related information acquisition means generates, as the piece of related information and from the audio signal supplied from the signal supply device, a character string indicative of a spoken content of the sound for reproduction by voice recognition. In the above configuration, the character string indicative of the spoken content of the sound for reproduction is generated from the audio signal that is supplied from the signal supply device and is indicative of the sound for reproduction. Thus, an advantage is obtained in that the information management system does not require an administrator to separately specify this character string as a specified character string. Furthermore, along with the emission of the sound for reproduction, the character string of the sound for reproduction is displayed on the terminal device. Thus, an advantage is obtained in that even when a user uses a device that is not equipped with a means for separate acquisition and storage of a character string indicative of a spoken content of a sound for reproduction, upon missing the emitted sound for reproduction, or in a case of a user who has difficulty in hearing the sound for reproduction (e.g., a hard-of-hearing person), the user is able to view the content of the sound for reproduction on his/her terminal device. Moreover, a required storage capacity of a terminal device for storing character strings indicative of a spoken content of a sound for reproduction consequently can be reduced.

In a preferred mode of the present invention, the audio signal acquisition means may acquire the audio signal indicative of the sound for reproduction, the audio signal being supplied from a signal supply device, and the related information acquisition means may generate, from the audio signal supplied from the signal supply device, a character string indicative of a spoken content of the sound for reproduction by voice recognition, and by machine translation of the generated character string, may generate the piece of related information indicative of a translation of the sound for reproduction. In this case, the related information is generated by machine translation of the character string indicative of the spoken content of the sound for reproduction. Thus, a further advantage is obtained in that there is no need to prepare, in advance, the related information in a language different from the language of the sound for reproduction.

In a preferred mode of the present invention, the audio signal acquisition means acquires the audio signal indicative of the sound for reproduction, the audio signal being supplied from a signal supply device. The related information acquisition means generates, from the audio signal supplied from the signal supply device, a character string indicative of a spoken content of the sound for reproduction by voice recognition, and generates, by machine translation of the generated character string, a character string indicative of a translation of the sound for reproduction, and further generates, as the piece of related information and by voice synthesis, an audio signal indicative of a spoken rendition of the character string indicative of the translation, the audio signal thus being indicative of the translation of the sound for reproduction. In the above mode, in parallel with the emission of the sound for reproduction, the sound for reproduction is reproduced by the terminal device, in a second language different from a first language of the sound for reproduction. Thus, an advantage is obtained in that even if a user of the terminal device is unable to understand the sound for reproduction in the first language, the user will be able to understand the reproduced content by listening to the sound for reproduction in the second language.

In a preferred mode of the present invention, the audio signal acquisition means acquires the audio signal indicative of the sound for reproduction, the audio signal being supplied from a signal supply device. The related information acquisition means generates, from the audio signal supplied from the signal supply device, a character string indicative of a spoken content of the sound for reproduction by voice recognition and acquires, as the piece of related information, a character string that is indicative of a translation of the sound for reproduction and is specified as a translation of the generated character string by an operation performed on an input device. In this mode, as the related information, the character string is acquired indicative of a result of an administrator's manual translation of the character string that is in the first language. Accordingly, compared with a case in which a character string indicative of the translation of the sound for reproduction is generated by machine translation, a second-language written translation of a guide voice V that is of a higher quality can be acquired.

In a preferred mode of the present invention, the audio signal acquisition means acquires the audio signal indicative of the sound for reproduction, the audio signal being supplied from a signal supply device. The related information acquisition means generates, from the audio signal supplied from the signal supply device, a character string indicative of a spoken content of the sound for reproduction by voice recognition, and generates, by machine translation of the generated character string, a character string indicative of a translation of the sound for reproduction, and acquires, as the piece of related information, a character string that is indicative of the translation of the sound for reproduction and has been edited by an operation performed on an input device. In this mode, a character string resulting from the administrator editing the character string indicative of a translation generated by machine translation is acquired as the related information. Thus, an advantage is obtained in that compared with a mode in which a character string indicative of a translation of a sound for reproduction is generated by machine translation alone, a written translation that is of a higher quality is acquired. Moreover, a further advantage is obtained in that, compared with a case in which a written translation by way of manual translation alone is acquired, an amount of work required of the administrator can be reduced, and related information can be acquired more quickly.

In a preferred mode of the present invention, the audio signal acquisition means acquires the audio signal indicative of the sound for reproduction, the audio signal being supplied from a signal supply device. The related information acquisition means acquires, as the piece of related information, a content related to the audio signal supplied from the signal supply device. In this mode, a content related to the audio signal indicative of the sound for reproduction are acquired as the related information. A user of the terminal device can thus be guided, with a simple configuration, to various information related to the sound for reproduction (e.g., information on services deriving from the sound for reproduction).

The present invention is characterized as a method of operation (information management method) for an information management system according to each of the above modes. The present invention is also characterized as a program that causes a computer to execute functions included in the information management system according to each of the above modes and as a computer-readable storage medium having the program stored thereon. That is, in one mode of an information management method of the present invention, the method includes: acquiring an audio signal representing a sound for reproduction; acquiring a piece of related information that is related to the sound for reproduction; associating the piece of related information acquired for the sound for reproduction with a piece of identification information that is notified to a terminal device upon emission of the sound for reproduction corresponding to the audio signal, and storing the piece of related information and the piece of identification information in a storage device; and receiving, from the terminal device, an information request that includes the piece of identification information notified to the terminal device and transmitting, to the terminal device, the piece of related information associated with the piece of identification information and stored in the storage device. In one mode of a program of the present invention, the program causes a computer to execute: an audio signal acquisition process that acquires an audio signal representing a sound for reproduction; a related information acquisition process that acquires a piece of related information that is related to the sound for reproduction; an association management process that associates the piece of related information acquired for the sound for reproduction in the related information acquisition process with a piece of identification information that is notified to a terminal device upon emission of the sound for reproduction corresponding to the audio signal; and an information providing process that receives, from the terminal device, an information request that includes the piece of identification information notified to the terminal device and transmits, to the terminal device, the piece of related information associated with the piece of identification information in the association management process. In the information management method, the program, or the computer-readable storage medium in which the program is stored according to each mode, an advantageous effect can be achieved similar to that of the information management system according to each of the above modes.

BRIEF DESCRIPTION OF THE DRAWINGS

FIG. 9 is a diagram depicting an operation of the terminal device upon acquiring related information.

FIG. 10 is a diagram depicting a configuration of a modification (Mode 1) of the audio signal acquisitor and the related information acquisitor.

FIG. 11 is a diagram depicting a configuration of a modification (Mode 2) of the audio signal acquisitor and the related information acquisitor.

MODES FOR CARRYING OUT THE INVENTION

First Embodiment

Figure 1:
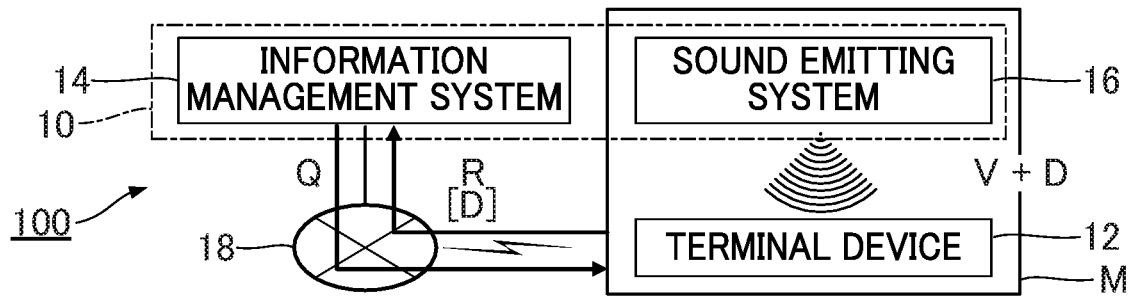
FIG. 1 is a diagram depicting a configuration of a communication system according to a first embodiment of the present invention.

FIG. 1 is a diagram depicting a configuration of a communication system 100 according to a first embodiment of the present invention. As shown in the example in FIG. 1, the communication system 100 of the first embodiment includes an information providing system 10 and a terminal device 12. The information providing system 10 is a computer system that provides a variety of information to the terminal device 12. The terminal device 12 is a portable information processing device, such as a mobile phone or a smartphone. In the following description, it is assumed that a user of the terminal device 12 is present in a facility (hereinafter, "exhibition facility") M such as a gallery or a museum in which exhibits such as art objects and documentation are displayed, and that information relating to each exhibit is provided from the information providing system 10 to the terminal device 12. In FIG. 1, a single terminal device 12 is shown for brevity. In reality, however, the information providing system 10 can provide information to each of multiple terminal devices 12.

As shown in the example in FIG. 1, the information providing system 10 of the first embodiment includes an information management system 14 and a sound emitting system 16. The sound emitting system 16 is installed in the exhibition facility M to be used for voice guidance in the facility. Specifically, as shown in the example in FIG. 1, the sound emitting system 16 of the first embodiment emits a voice for guiding the user (hereinafter, "guide voice V") in a specific language (hereinafter, "first language") and notifies the terminal device 12 of identification information D assigned in advance to the guide voice V. Guide voices V are for example sounds that provide explanations of exhibits, or provide an audio tour of the exhibition facility M. The identification information D of the guide voice V is notified to the terminal device 12 by wireless information communication. In the first embodiment, an example is described in which the identification information D is notified from the sound emitting system 16 to the terminal device 12 by sound communication, in which a sound (a sound wave), i.e., vibration of the air, is used as a transmission medium. That is, the identification information D is emitted from the sound emitting system 16 as a sound along with the guide voice V.

The information management system 14 is a computer system that manages information provided to the terminal device 12. The terminal device 12 is capable of communicating with the information management system 14 via a communication network 18 that includes a mobile communication network, the Internet, etc. As shown in the example in FIG. 1, the terminal device 12 transmits to the information management system 14 an information request R that includes the identification information D notified from the sound emitting system 16. The information management system 14 transmits, to the request-source terminal device 12, related information Q that corresponds to the identification information D specified in the information request R received via the communication network 18. The related information Q is information that is related to the guide voice V. In the first embodiment, the terminal device 12 is provided with related information Q indicative of a translation in which guidance that is spoken as the guide voice V in the first language has been translated into another language (hereinafter, "second language"). Accordingly, users who can understand the first language will be able to understand the guidance for the exhibition facility M by listening to guide voices V, while users who can understand the second language will be able to understand the guidance for the exhibition facility M by referring to related information Q. Details are provided below on a specific configuration and a function of each element in the communication system 100 briefly described above.

Information Management System 14

Figure 2:
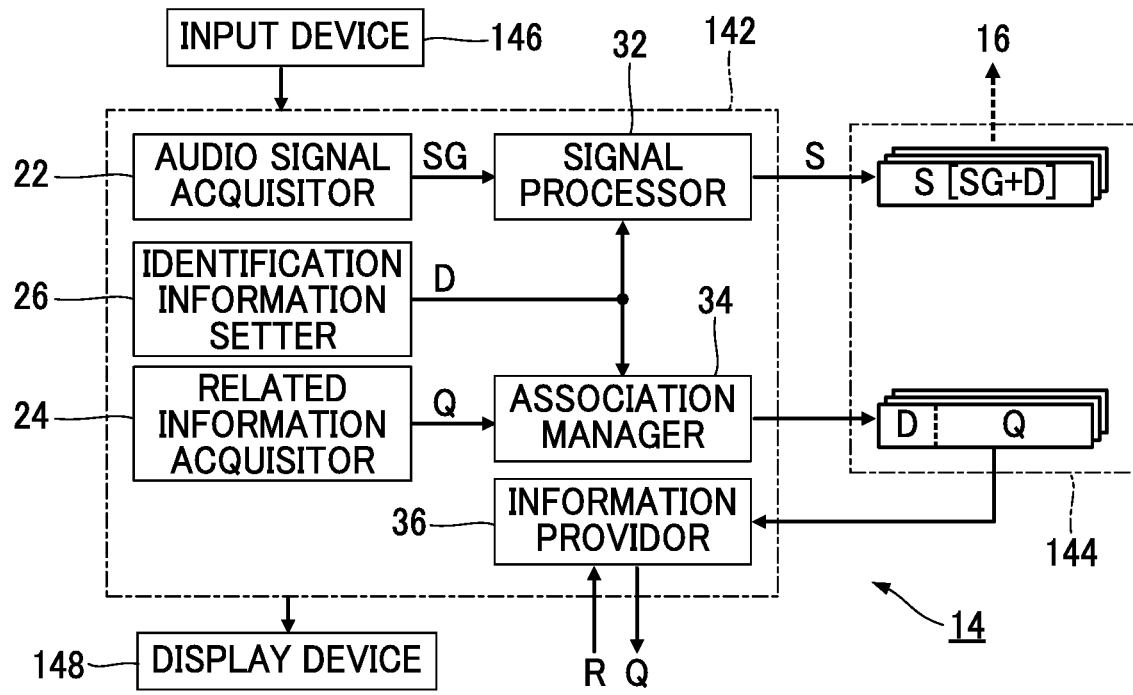
FIG. 2 is a diagram depicting a configuration of an information management system.

FIG. 2 is a diagram depicting a configuration of the information management system 14. As shown in the example in FIG. 2, the information management system 14 of the first embodiment includes a control device 142, a storage device 144, an input device 146, and a display device 148. The storage device 144 stores a variety of data for use by the control device 142, and also a program executed by the control device 142. Any publicly known storage medium, such as a semiconductor storage medium or a magnetic storage medium, or a combination of different types of storage media can be used for the storage device 144. The input device 146 is operational equipment that an administrator who operates the information management system 14 operates to provide various instructions to the information management system 14. The input device 146 includes, for example, operating units operable by the administrator. For example, by appropriately operating the input device 146, the administrator can provide an instruction for a character string (hereinafter, "specified character string ST") that contains guidance for each exhibit in the exhibition facility M. The display device 148 is a device (e.g., liquid-crystal display panel) that displays, under control of the control device 142, a variety of information, such as results of voice recognition and machine translation. Here, a touch panel may be employed as an integral formation of the input device 146 and the display device 148.

As shown in the example in FIG. 2, the control device 142 may be a central processing unit (CPU), and accomplishes the functions of the information management system 14 by coordinating with the program stored in the storage device 144. That is, by executing the program stored in the storage device 144, the control device 142 accomplishes functions (an audio signal acquisitor 22, a related information acquisitor 24, an identification information setter 26, a signal processor 32, an association manager 34, and an information provider 36) to manage information to be provided to the terminal device 12. A configuration may be employed in which functions of the control device 142 are distributed among multiple devices. Additionally or alternatively, a configuration may be employed such that a part of the functions of the control device 142 is carried out by dedicated electronic circuitry.

Figure 3:
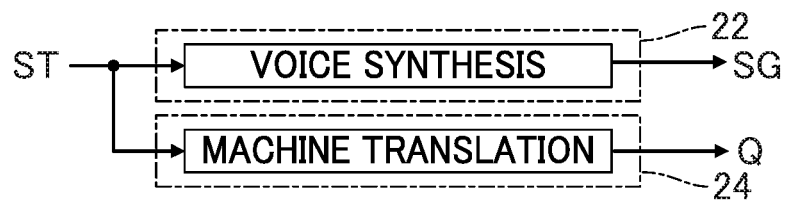
FIG. 3 is a diagram depicting a configuration of an audio signal acquisitor and a related information acquisitor.

The audio signal acquisitor 22 acquires audio signals SG representing guide voices V. As shown in the example in FIG. 3, the audio signal acquisitor 22 of the first embodiment generates, by voice synthesis, an audio signal SG that represents a time waveform of a guide voice V, the guide voice V being a spoken rendition of a specified character string ST that is in the first language and is specified by the administrator via operation of the input device 146. Any publicly known technique can be used for the voice synthesis executed by the audio signal acquisitor 22. The audio signal acquisitor 22 can generate audio signals SG by, for example, unit-concatenative-type voice synthesis, which generates audio signals SG by concatenating in order of time, from among voice units (phonemes or phoneme chains) prepared beforehand, voice units that correspond to the characters in specified character strings ST, or by statistical-model-based voice synthesis, which generates audio signals SG corresponding to specified character strings ST by utilizing a statistical model, such as the Hidden Markov Model (HMM). In this embodiment, since audio signals SG indicating guide voices V are generated by voice synthesis, an advantage is obtained in that the guide voices V need not be recorded in advance.

The related information acquisitor 24 in FIG. 2 generates related information Q that is related to a guide voice V. As shown in the example in FIG. 3, by machine translation of (automatic translation of) the specified character string ST, which is in the first language and is specified by the administrator, the related information acquisitor 24 of the first embodiment generates, as related information Q, a character string (hereinafter, "translated character string CT") that represents guidance for the exhibition facility M in the second language. Any publicly known technique can be used for the machine translation of specified character strings ST. The related information acquisitor 24 can generate the related information Q by utilizing, for example, rule-based machine translation in which word-order and words are converted based on results of parsing specified character strings ST and on linguistic rules, or by statistical machine translation in which specified character strings ST are translated into the second language using statistical models (a translation model and a language model) wherein statistical tendencies of languages are represented. In this embodiment, since the related information Q is generated by machine translation of a character string that indicates a spoken content of the guide voice V (i.e., by machine translation of the specified character string ST), an advantage is obtained in that there is no need to prepare, in advance, the related information Q in a language different from the language of the guide voice V.

The identification information setter 26 in FIG. 2 assigns the identification information D, which is to be notified to the terminal device 12 from the sound emitting system 16 along with the reproduction of the guide voice V. The identification information D consists of a unique code for identifying a guide voice V, and is assigned to each guide voice V. For example, the identification information setter 26 assigns to a guide voice V, as the identification information D, a series of random numbers that is generated by a publicly known technique such that the series does not overlap with another series for a different guide voice V.

The signal processor 32 generates an audio signal S by synthesizing the identification information D assigned by the identification information setter 26 with the audio signal SG of the guide voice V. Any publicly known technique, for example audio watermarking, can be used for the synthesis of the identification information D with the audio signal SG. For example, the technique described in WO 2010/016589 can be preferably used. Specifically, as shown in the example in FIG. 4, the signal processor 32 includes a demodulation processor 322 and a mixing processor 324. The demodulation processor 322 generates an audio signal (hereinafter, "modulated signal") SD that includes the identification information D as a sound component of a particular frequency band by sequentially executing spread modulation of the identification information D using a spread code, and by executing frequency conversion using a carrier of the particular frequency. The frequency band of the modulated signal SD is a frequency band within which the sound emitting system 16 can emit sounds and within which the terminal device 12 can receive sounds, and is within a frequency band range (e.g., 18 kHz or higher and 20 kHz or lower) that is higher than a frequency band (e.g., about 16 kHz or lower within the audible frequency band) for sounds such as voices or musical sounds that are audible to a user in a normal environment. A manner in which the demodulation processor 322 generates modulated signals SD is not limited to the above example (spread modulation). For example, a modulated signal SD within a specific frequency band (e.g., 18 kHz or higher and 20 kHz or lower) can be generated by frequency-modulating a carrier such as a sine wave of a particular frequency with the identification information D.

Figure 4:
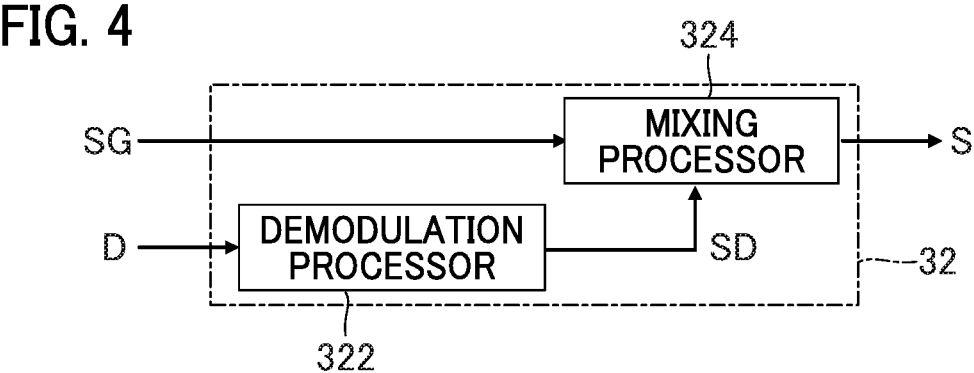
FIG. 4 is a diagram depicting a configuration of a signal processor.

The mixing processor 324 in FIG. 4 generates the audio signal S by superimposing (typically, adding) the audio signal SG acquired by the audio signal acquisitor 22 and the modulated signal SD generated by the demodulation processor 322. As can be understood from the above description, the audio signal S includes a sound component of the guide voice V (audio signal SG) and a sound component that includes the identification information D of the guide voice V (modulated signal SD).

Figure 5:
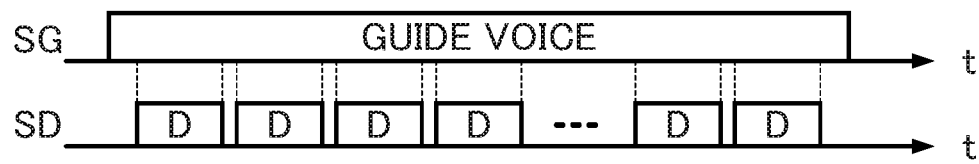
FIG. 5 is a diagram depicting an operation of the signal processor.

FIG. 5 is a diagram describing a temporal relationship between the audio signal SG of the guide voice V and the modulated signal SD including the identification information D. As shown in the example in FIG. 5, the modulated signal SD including the identification information D of the guide voice V is added repeatedly multiple times to different sections along the time axis in the audio signal SG of the guide voice V. That is, the sound component of the identification information D of the guide voice V is mixed at multiple points in the guide voice V along the time axis.

Here, modulated signals SD can be connected in a continuous manner to each other along the time axis.

The signal processor 32 of the first embodiment stores the audio signal S in the storage device 144 as an audio file in a particular format (e.g., in a WAV format or in an MP3 format). By repeating the process multiple times, for each of guide voices V with different guide contents (guide voices V for different exhibits on which guidance is provided), an audio signal S that includes the sound component of the guide voice V (audio signal SG) and the sound component including the identification information D of the guide voice V (modulated signal SD) is stored in the storage device 144.

The association manager 34 in FIG. 2 associates the identification information D assigned to each guide voice V by the identification information setter 26 with the related information Q acquired for the guide voice V by the related information acquisitor 24 and stores the identification information D and the related information Q in the storage device 144. Accordingly, as shown in the example in FIG. 2, a piece of related information Q is stored in the storage device 144 for each piece of identification information D of a corresponding guide voice V. As will be understood from the above description, an audio signal S and a piece of related information Q are generated for each of the guide voices V emitted in the exhibition facility M. In other words, an audio signal SG (audio signal S) and a piece of related information Q that each correspond to a common guide voice V are associated with each other by a corresponding piece of identification information D. Although FIG. 2 shows an example configuration in which audio signals S and pieces of related information Q are stored in the storage device 144, the audio signals S and the pieces of related information Q can be stored in separate storage media. Alternatively, a configuration can be employed in which at least one external device that is connected to and can exchange data with the information management system 14 is used as a storage device that stores audio signals S and pieces of related information Q.

The information provider 36 in FIG. 2 receives an information request R including a piece of identification information D from the terminal device 12 and selects, from the multiple pieces of related information Q stored in the storage device 144, the piece of related information Q corresponding to the piece of identification information D specified in the information request R to transmit the selected piece of related information Q to the request-source terminal device 12. The transmission of the related information Q to the terminal device 12 is described later.

Figure 6:
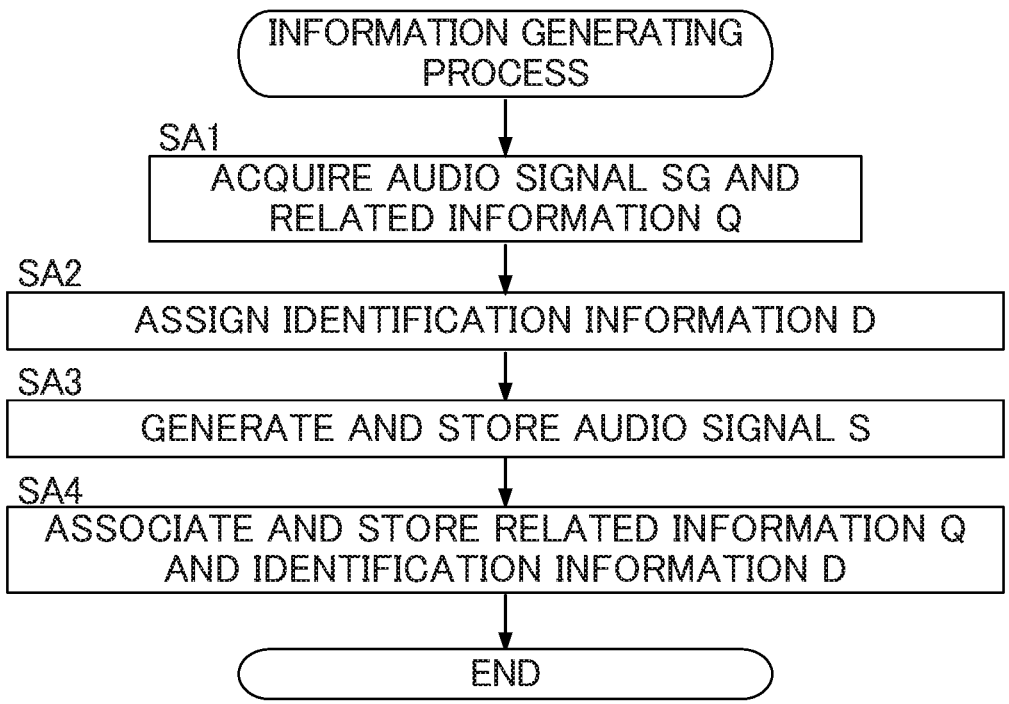
FIG. 6 is a flowchart illustrating an operation of the information management system.

FIG. 6 is a flowchart for a process of the information management system 14 to generate an audio signal S and related information Q (hereinafter referred to as "information generating process"). The information generating process shown in FIG. 6 is initiated, for example, after the administrator operating on the input device 146 (specifically, after the administrator specifying a specified character string ST). After the information generating process is initiated, the control device 142 (the audio signal acquisitor 22 and the related information acquisitor 24) acquires an audio signal SG of a guide voice V that corresponds to the specified character string ST and related information Q that is related to the guide voice V (SA1). The control device 142 (the identification information setter 26) assigns identification information D to the guide voice V (SA2). The control device 142 (the signal processor 32) generates an audio signal S in which a modulated signal SD including the identification information D of the guide voice V is superimposed on the audio signal SG of the guide voice V and stores the generated audio signal S in the storage device 144 (SA3). The control device 142 (the association manager 34) associates the related information Q for the guide voice V with the identification information D and stores them in the storage device 144 (SA4).

Audio signals S (audio files) generated by the information management system 14 in the information generating process described above as an example are transferred to the sound emitting system 16 shown in FIG. 1. A manner in which the audio signals S are transferred can be freely chosen. For example, the audio signals S may be transferred from the information management system 14 to the sound emitting system 16 via the communication network 18, or the audio signals S may be transferred from the information management system 14 to the sound emitting system 16 via a portable storage medium, such as a semiconductor storage medium.

Sound Emitting System 16

Figure 7:
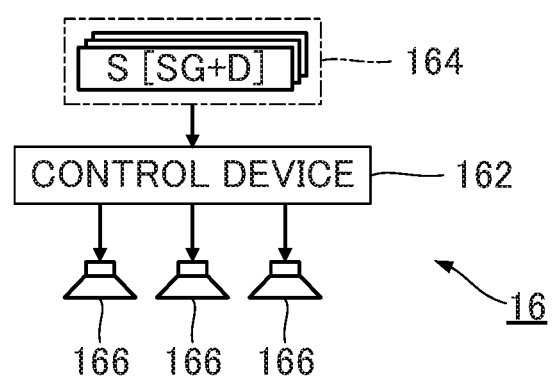
FIG. 7 is a diagram depicting a configuration of a sound emitting system.

FIG. 7 is a configuration diagram of the sound emitting system 16. As shown in the example in FIG. 7, the sound emitting system 16 of the first embodiment includes a control device 162, a storage device 164, and sound emitting devices 166. The storage device 164 is a publicly known storage medium, such as a semiconductor storage medium or a magnetic storage medium, or a combination of different types of storage media. In the storage device 164, the audio signals S transferred from the information management system 14 are stored.

The control device 162 controls each element in the sound emitting system 16. The control device 162 of the first embodiment provides the sound emitting devices 166 with the audio signals S stored in the storage device 164. The sound emitting devices 166 are each placed proximate to a corresponding one of different exhibits in the exhibition facility M. A sound emitting device 166 placed proximate to an exhibit is provided with an audio signal S corresponding to a guide voice V for the exhibit. Each sound emitting device 166 is an audio device that emits sounds according to audio signals S provided from the control device 162. The illustration of a D/A converter that converts audio signals S from a digital format to an analog format is omitted for brevity.

As described above with reference to FIGS. 4 and 5, an audio signal S includes an audio signal SG representing a guide voice V and a modulated signal SD including the identification information D of the guide voice V. Thus, a sound emitting device 166 corresponding to one exhibit emits a sound indicative of a guide voice V for the exhibit and the corresponding identification information D. As shown in the example in FIG. 5, a modulated signal SD for the identification information D is added repeatedly multiple times to an audio signal SG. The sound of the identification information D of the guide voice V is thus emitted repeatedly multiple times in parallel with the reproduction of the guide voice V. A user, who is close to the sound emitting device 166 (who is near the exhibit) hears the guide voice V for the exhibit, and the identification information D of the guide voice V is notified to the user's terminal device 12 by sound communication. As described above, because the frequency band of the modulated signal SD including the identification information D is in a higher pitch range (e.g., 18 kHz or higher and 20 kHz or lower) compared with the frequency band of sounds that the user is able to hear in a normal environment, the sound of the identification information D is scarcely audible to the user. Accordingly, the identification information D can be transmitted to the terminal device 12 using sound communication without impeding the guide voice V being listened to by the user.

Terminal Device 12

Figure 8:
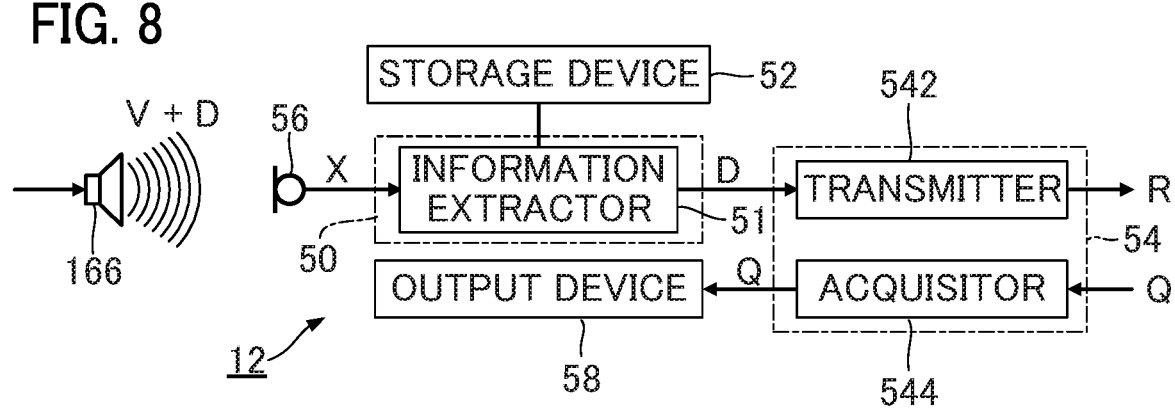
FIG. 8 is a diagram depicting a configuration of a terminal device.

FIG. 8 is a diagram showing a configuration of the terminal device 12. In FIG. 8, one of the sound emitting devices 166 of the sound emitting system 16 is also illustrated. As shown in the example in FIG. 8, the terminal device 12 of the first embodiment includes a control device 50, a storage device 52, a communication device 54, a sound receiving device 56, and an output device 58. The storage device 52 stores data used by the control device 50, and also a program executed by the control device 50. Any publicly known storage medium, such as a semiconductor storage medium or a magnetic storage medium, or a combination of different types of storage media can be used as the storage device 52.

The sound receiving device 56 is an audio device (a microphone) that receives ambient sounds, and is used in voice calls between terminal devices 12, or in recording sounds during filming of video. As shown in the example in FIG. 8, the sound receiving device 56 of the first embodiment receives a sound emitted from the sound emitting device 166 in the exhibition facility M and generates an audio signal (hereinafter "received-audio signal") X representative of the time waveform of the received sound. Thus, the received-audio signal X includes a sound component of the guide voice V (audio signal SG) and a sound component of the identification information D of the guide voice V (modulated signal SD). In the interest of brevity, illustration is omitted of an A/D converter that converts the received-audio signal X generated by the sound receiving device 56 from an analog format to a digital format.

The control device 50 controls each element in the terminal device 12. The control device 50 of the first embodiment is, for example, a CPU and serves as an information extractor 51 by executing the program stored in the storage device 52. The information extractor 51 extracts the identification information D of the guide voice V by demodulating the received-audio signal X generated by the sound receiving device 56. Specifically, the information extractor 51 selects, from the received-audio signal X, a band component in a frequency band (18 kHz or higher and 20 kHz or lower) that is in a high pitch range and includes the identification information D by use of, for example, a high-pass filter. The information extractor 51 then extracts the identification information D by passing the selected band component through a matched filter in which there is used, as a coefficient, the spread code used in the spread modulation of the identification information D.

The communication device 54 is communication equipment that communicates with the information providing system 10 via the communication network 18. A scheme for communication between the communication device 54 and the communication network 18 can be chosen at will. Typically, there is used a wireless communication scheme (e.g., information communication using radio waves or infrared rays as transmission media) that differs from the sound communication used by the sound emitting system 16 to notify terminal devices 12 of identification information D. As shown in the example in FIG. 8, the communication device 54 of the first embodiment includes a transmitter 542 and an acquisitor 544. The transmitter 542 transmits, to the information management system 14, an information request R that includes the identification information D extracted from the received-audio signal X by the information extractor 51. The acquisitor 544 acquires related information Q transmitted from the information management system 14 in response to the information request R. As described above with reference to FIG. 5, the modulated signal SD of the identification information D is added repeatedly multiple times to the audio signal SG of the guide voice V. Although it is thus possible for the information extractor 51 to extract a single piece of identification information D at a time repeatedly multiple times at different time points, transmission of an information request R and acquisition of corresponding related information Q are executed only when the information extractor 51 extracts new identification information D for the first time. As described in the above example, in the first embodiment a single piece of identification information D is transmitted repeatedly multiple times. Thus, an advantage is obtained that even when the terminal device 12 fails to acquire identification information D due to interference by surrounding noise, for example, the terminal device 12 is able to again acquire the identification information D.

The output device 58 in FIG. 8 outputs the related information Q acquired by the acquisitor 544 from the information management system 14. In the first embodiment, there is employed as the output device 58 a display device that displays a translated character string CT, in the second language, that is indicated by the related information Q. That is, in parallel with the reproduction of the guide voice V in the first language by the sound emitting device 166 of the sound emitting system 16, the translated character string CT in the second language is displayed (presented) on the terminal device 12. Accordingly, even when the user of the terminal device 12 is unable to understand the first language, the user will be able to understand guidance on exhibits by viewing the translated character strings CT in the second language.

FIG. 9 is a diagram illustrating an operation of the terminal device 12 used to acquire related information Q. As described above, from each of the sound emitting devices 166 of the sound emitting system 16, a sound of identification information D is repeatedly emitted in parallel with the reproduction of a guide voice V. When the user of the terminal device 12 moves within a range of sounds emitted from a sound emitting device 166, namely, moves close to an exhibit, the sound receiving device 56 of the terminal device 12 generates a received-audio signal X that includes a sound component of a guide voice V and a sound component of a corresponding piece of identification information D (SB1). The control device 50 (the information extractor 51) extracts the piece of identification information D by demodulating the received-audio signal X (SB2), and the transmitter 542 of the communication device 54 transmits to the information management system 14 an information request R that includes the piece of identification information D (SB3).

The information provider 36 of the information management system 14 receives the information request R transmitted by the terminal device 12 from the communication network 18. Then the information provider 36 selects, from multiple pieces of related information Q stored in the storage device 144, the piece of related information Q corresponding to the piece of identification information D specified in the information request R (SB4), and transmits the selected piece of related information Q to the request-source terminal device 12 (SB5). The acquisitor 544 of the terminal device 12 acquires the piece of related information Q transmitted from the information management system 14 (SB6), and the output device 58 outputs the piece of related information Q (SB7). As will be understood from the above description, after the terminal device 12 receives the sound of identification information D emitted from the sound emitting device 166 of the sound emitting system 16 in parallel with the reproduction of the guide voice V, namely, after the terminal device 12 moves within a range in which a sound wave from the sound emitting device 166 reaches the terminal device 12, the transmission of the information request R including the identification information D (SB3) and the acquisition of the related information Q corresponding to the identification information D (SB6) are executed.

As described above, in the first embodiment, a sound is emitted that corresponds to the audio signal S that includes the audio signal SG of the guide voice and the modulated signal SD that includes the identification information D of the guide voice. That is, the identification information D is notified to the terminal device 12 by sound communication that utilizes sounds emitted along with the guide voice. Thus, an advantage is obtained in that the sound receiving device 56 used for voice calls and recording sounds can be used to acquire identification information D, and consequently, there is no need for communication equipment dedicated to wireless communication of identification information D. Moreover, an advantage is obtained in that, in the sound emitting system 16, there is no need for communication equipment dedicated to the transmission of identification information D, and in that the existing sound emitting devices 166, which are used for voice guidance, can be used to notify the terminal device 12 of identification information D. Furthermore, according to the configuration in which identification information D is communicated to the terminal device 12 by sound communication, there are advantages in that a range within reach of the sound of identification information D can be controlled without difficulty, and in that identification information D can be notified collectively to multiple terminal devices 12.

In the first embodiment, a piece of identification information D to be notified to the terminal device 12 upon emission of a guide voice V and a piece of related information Q that is related to the guide voice V are associated with each other by the information management system 14, and from among multiple pieces of related information Q, the piece of related information Q that corresponds to the piece of identification information D notified to the terminal device 12 is provided to the terminal device 12. Accordingly, there is no need for the storage device 52 of the terminal device 12 to store multiple pieces of related information Q in advance. According to the above configuration, compared with the techniques in Patent Documents 1 and 2, an advantage is obtained in that a storage capacity that is required of the terminal device 12 to store related information Q can be greatly reduced. In a configuration in which multiple pieces of related information Q are stored in each terminal device 12, when a piece of related information Q is required to be updated, the piece of related information Q needs to be updated separately in each terminal device 12. In the first embodiment, multiple pieces of related information Q are stored in the storage device 144 of the information management system 14, and are selectively provided to the terminal device 12. Accordingly, by updating related information Q stored in the storage device 144, it is possible to provide each terminal device 12 with updated related information Q. Thus, an advantage is obtained in that related information Q need not be updated separately for each terminal device 12.

In the first embodiment, the identification information D of the guide voice V is notified to the terminal device 12 along with the reproduction of the guide voice V. The related information Q corresponding to the identification information D can thus be outputted on the terminal device 12 in parallel with the reproduction of the guide voice V. Compared with a configuration in which related information Q is outputted after reproduction of a guide voice V, for example, an advantage is obtained in that the user is able to recognize with ease the association between the guide voice V and the related information Q.

Japanese Patent Application Laid-Open Publication No. 2011-109629 (hereinafter "Related Art 1"), for example, discloses an auto-reproducing voice guide system that utilizes transmission devices placed near exhibits in a gallery or a museum and portable receivers carried by users. A transmission device intermittently transmits an identification code unique to an exhibit to its surroundings by radio waves or infrared rays. A portable receiver reproduces, from among guide voices stored beforehand in its storage medium, a guide voice that corresponds to an identification code received from a transmission device. According to Related Art 1, after a portable receiver moves within a range (around an exhibit) wherein radio waves or infrared rays from a transmission device reach the portable receiver and receives an identification code, a guide voice describing the exhibit within this range is reproduced.

In Related Art 1, however, because the identification code of each exhibit is transmitted by radio waves or infrared rays, dedicated communication equipment to transmit or receive radio waves or infrared rays is required to be attached to each of the transmission devices and each of the portable receivers. In the first embodiment, a sound is emitted that corresponds to the audio signal S, which includes the audio signal SG of the guide voice V and the modulated signal SD including the identification information D of the guide voice V. That is, the identification information D is notified to the terminal device 12 by sound communication that utilizes sounds emitted along with the guide voice V. Thus, an advantage is obtained in that the sound receiving device 56 used for voice calls and recording sounds can be used to acquire identification information D, and consequently, there is no need for communication equipment dedicated to wireless communication of identification information D. Moreover, an advantage is obtained in that, in the sound emitting system 16, there is no need for communication equipment dedicated to the transmission of identification information D, and in that the existing sound emitting devices 166, which are used for voice guidance, can be used to notify the terminal device 12 of identification information D. In other words, identification information D can be transmitted and received with a simple configuration by utilizing a component that emits and receives sounds. Furthermore, according to the configuration in which identification information D is communicated to the terminal device 12 by sound communication, there are advantages in that a range within reach of the sound of identification information D can be controlled without difficulty, and in that identification information D can be notified collectively to multiple terminal devices 12.

Japanese Patent Application Laid-Open Publication No. 2000-207170 (hereinafter "Related Art 2"), for example, discloses an information processing device that adds, to an audio signal to be reproduced, additional information in a manner that does not interfere with listening to the sound corresponding to the audio signal to generate an output audio signal. In an announcement system using this information processing device, when transmitting information as voice guidance to a user via a speaker, a server adds, to the information, information related to the voice guidance (e.g., translation) as the additional information. The additional information is superimposed on the audio signal by a spread-spectrum technique, for example.

In the above-described sound communication in which sound waves, which are vibrations of the air, are used as transmission media, a transmission speed and a transmission capacity tend to be low as compared with wireless communication that uses, for example, radio waves as transmission media. In Related Art 2, additional information (i.e., related information) is transmitted by sound communication. In the first embodiment, identification information D is transmitted by sound communication. The configuration of the first embodiment, therefore, has an advantage in that an amount of data transmitted by sound communication is reduced because identification information D, which has a smaller data size than related information, is transmitted. Because a communication capacity is small in sound communication, additional information that can be transmitted under the Related Art 2 is in reality limited to information with a small data size. In the first embodiment, identification information is transmitted by sound communication, and related information corresponding to the identification information is distributed from the information management system 14. Accordingly, various kinds of related information with large data sizes (e.g., sounds or images) can also be presented to users.

Modifications of First Embodiment

In the first embodiment, the audio signal SG is generated by voice synthesis using the specified character string ST that is specified by the administrator of the information management system 14, and the related information Q is generated by machine translation of the specified character string ST. Ways of acquiring (typically, generating) the audio signal SG and the related information Q are not limited to these examples. Examples of other ways of acquiring the audio signal SG and the related information Q are described below. Concerning processes for acquiring the audio signal SG and the related information Q in each mode described below, an order of executing the process to acquire (or generate) the audio signal SG and the process to acquire (or generate) the related information Q may be changed, as appropriate.

Modification Mode 1

In mode 1 illustrated in the example in FIG. 10, the audio signal acquisitor 22 of the information management system 14 generates the audio signal SG of the guide voice V by voice synthesis from the specified character string ST in a manner similar to that employed in the first embodiment. The related information acquisitor 24 acquires, as the related information Q, the specified character string ST specified by the administrator. That is, the related information Q is a character string that represents a spoken content of the guide voice V in the first language, the first language being also used for the guide voice V. In the above configuration, in parallel with the reproduction of the guide voice V by the sound emitting system 16, the character string of the spoken content of the guide voice V is displayed on the terminal device 12. Thus, an advantage is obtained in that a hard-of-hearing person (hearing-impaired person), for example, is able to view the content of the guide voice V.

In this mode of the information generating process according to the present embodiment (FIG. 6), the step in which the audio signal SG of the guide voice V corresponding to the specified character string ST and the related information Q related to the guide voice V are acquired (SA1) is understood to include: generating the audio signal SG of the guide voice V corresponding to the specified character string ST by voice synthesis; and acquiring the specified character string ST as the related information Q.

Modification Mode 2

In mode 2 illustrated in the example in FIG. 11, the audio signal acquisitor 22 of the information management system 14 generates the audio signal SG of the guide voice V by voice synthesis from the specified character string ST in the first language, in a manner similar to that employed in the first embodiment. The administrator of the information management system 14, by appropriately operating the input device 146, specifies a character string (translated character string CT) representing the guide voice V in the second language. The related information acquisitor 24 acquires the translated character string CT, which is in the second language and is specified by the administrator, as the related information Q. In the configuration illustrated in FIG. 3 referred to above, appropriate translated character strings CT cannot be generated when accuracy of machine translation is low. In mode 2 illustrated in the example in FIG. 11, machine translation of specified character strings ST (FIG. 3) is unnecessary. Thus, an advantage is obtained in that it is possible to prepare related information Q that is generated by manual translation (human translation), for example, and that represents guide voices V accurately in the second language.

In this mode, the step SA1 of the information generating process (FIG. 6) is understood to include: generating the audio signal SG of the guide voice V corresponding to the specified character string ST by voice synthesis; and acquiring a translated character string CT that is specified (i.e., acquiring a character string derived from the translation of the spoken content of the guide voice V into the second language) as the related information Q.

Modification Mode 3

Figure 12:
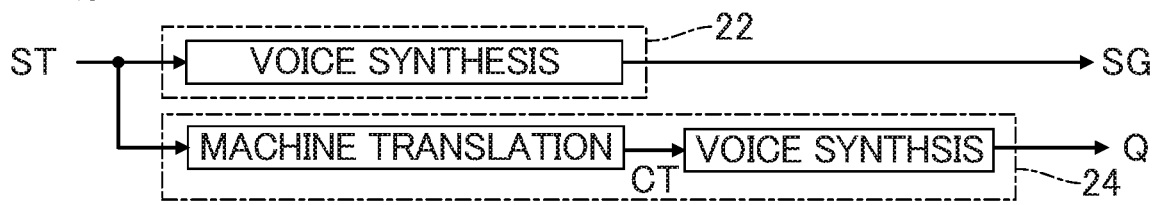
FIG. 12 is a diagram depicting a configuration of a modification (Mode 3) of the audio signal acquisitor and the related information acquisitor.

In mode 3 shown in the example in FIG. 12, the audio signal acquisitor 22 of the information management system 14 generates the audio signal SG of the guide voice V by voice synthesis from the specified character string ST in a manner similar to that employed in the first embodiment. The related information acquisitor 24 generates a translated character string CT in the second language by machine translation of the specified character string ST in the first language and generates, as the related information Q, an audio signal of the guide voice V in the second language by voice synthesis from the translated character string CT. The output device 58 of the terminal device 12 includes a sound emitting device (such as a speaker or an earpiece) for emission of a sound (the guide voice V in the second language) corresponding to the audio signal indicated by the related information Q provided from the information management system 14. That is, in parallel with the reproduction of the guide voice V in the first language by the sound emitting system 16, the guide voice V in the second language is reproduced by the terminal device 12. Accordingly, even when the user of the terminal device 12 is unable to understand the first language, the user will be able to understand guidance on exhibits by listening to guide voices V in the second language.

In this mode, the step SA1 of the information generating process (FIG. 6) is understood to include: generating the audio signal SG of the guide voice V corresponding to the specified character string ST by voice synthesis; generating a translated character string CT indicating the translation of the guide voice V by machine translation of the specified character string ST that is specified (i.e., machine translation of the character string indicating the spoken content of the guide voice V); and generating by voice synthesis an audio signal that is a spoken rendition of the translated character string CT and that indicates the guide voice V (i.e., generating an audio signal that indicates a vocal sound that is a spoken rendition of the character string derived from the translation of the spoken content of the guide voice V into the second language).

Modification Mode 4

Figure 13:
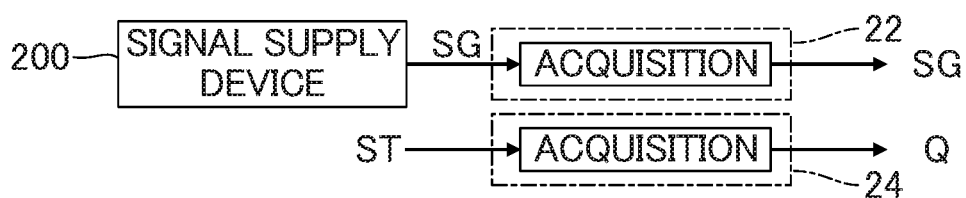
FIG. 13 is a diagram depicting a configuration of a modification (Mode 4) of the audio signal acquisitor and the related information acquisitor.

In mode 4 illustrated in the example in FIG. 13, the audio signal acquisitor 22 of the information management system 14 acquires the audio signal SG of the guide voice V from a signal supply device 200. The signal supply device 200 may be a sound receiving device that receives sounds in its vicinity and generates an audio signal SG; or may be a reproducing device that acquires an audio signal SG from a portable or built-in storage medium and outputs the signal; or may be a communication device that receives an audio signal SG from the communication network 18 and outputs the signal. The related information acquisitor 24 acquires, as the related information Q, a specified character string ST specified by the administrator, as in the above-described mode 1 or mode 2. Accordingly, a sound emitting device 166 emits the guide voice V corresponding to the audio signal SG generated by the signal supply device 200, and the specified character string ST that accords with the instruction from the administrator is displayed on the terminal device 12. The related information acquisitor 24 may acquire, as the related information Q, an audio signal (e.g., audio signal of the guide voice V in the second language) from the signal supply device 200.

In this mode, the step SA1 of the information generating process (FIG. 6) is understood to include: acquiring the audio signal SG of the guide voice V from the signal supply device 200; and acquiring the specified character string ST that is specified (i.e., acquiring the character string indicating the spoken content of the guide voice V) as the related information Q.

Modification Mode 5

Figure 14:
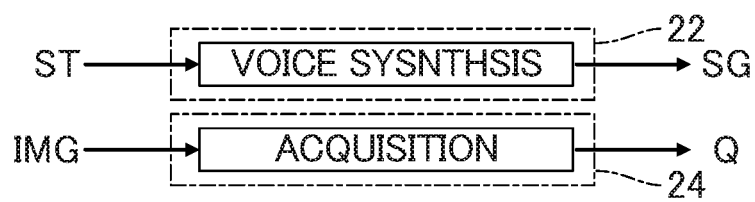
FIG. 14 is a diagram depicting a configuration of a modification (Mode 5) of the audio signal acquisitor and the related information acquisitor.

In mode 5 illustrated in the example in FIG. 14, the audio signal acquisitor 22 of the information management system 14 generates the audio signal SG of the guide voice V by voice synthesis from the specified character string ST in a manner similar to that employed in the first embodiment. The related information acquisitor 24 acquires, as the related information Q, an image IMG (still or moving) that is related to the guide voice V. Accordingly, in parallel with the reproduction of the first-language guide voice V corresponding to the specified character string ST, the image IMG related to the guide voice V is displayed on the terminal device 12. In this mode, because the image IMG related to the guide voice V is acquired as the related information Q, there is an advantage in that the image IMG need not be stored in advance in the terminal device 12. A large amount of the storage capacity of the terminal device 12 is taken up when image data with large data sizes are stored thereon. According to the present mode, the storage capacity required of the terminal device 12 to store images IMG related to guide voices V can be greatly reduced.

In this mode, the step SA1 of the information generating process (FIG. 6) is understood to include: generating the audio signal SG of the guide voice V corresponding to the specified character string ST by voice synthesis; and acquiring an image IMG related to the guide voice V as the related information Q.

Modification Mode 6

Figure 15:
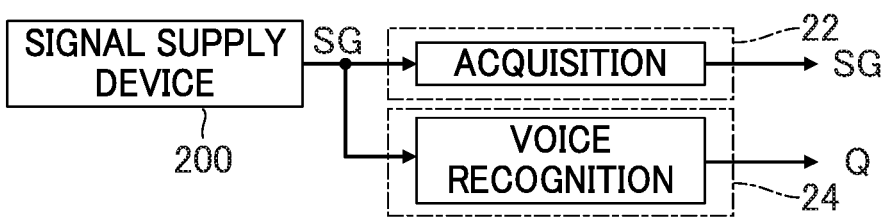
FIG. 15 is a diagram depicting a configuration of a modification (Mode 6) of the audio signal acquisitor and the related information acquisitor.

In mode 6 illustrated in the example in FIG. 15, the audio signal acquisitor 22 of the information management system 14 acquires the audio signal SG of the guide voice V from a signal supply device 200 similar to that illustrated in FIG. 13 (mode 4). The related information acquisitor 24 generates, as the related information Q, a character string that represents the spoken content of the guide voice V by voice recognition of the audio signal SG provided from the signal supply device 200. For voice recognition of audio signals SG, any publicly known technique can be used, such as a recognition technique using an audio model such as HMM or a language model indicating linguistic constraints. As will be understood from the above description, in mode 6, in parallel with reproduction of the guide voice V by the sound emitting system 16, the character string of the spoken content of the guide voice V is displayed on the terminal device 12, as in mode 1 (FIG. 10) described above. Thus, an advantage is obtained in that even when a user uses a terminal device 12 that is not equipped with a means for separate acquisition and storage of a character string indicating the spoken content of a guide voice V, upon missing the emitted guide voice V or in a case of a user who has difficulty in hearing the guide voice V (e.g., a hard-of-hearing person), the user is able to view the content of the guide voice V. The storage capacity required of the terminal device 12 to store character strings indicative of spoken contents of guide voices V is reduced. The related information acquisitor 24 of the information management system 14 generates, by voice recognition, character strings indicative of spoken contents of guide voices V from audio signals SG that indicate the guide voices V and are supplied from the signal supply device 200. Thus, an advantage is obtained in that the information management system 14 does not require the administrator to separately specify these character strings as specified character strings ST.

In this mode, the step SA1 of the information generating process (FIG. 6) is understood to include: acquiring the audio signal SG of the guide voice V, the audio signal SG being supplied from the signal supply device 200; and generating, as the related information Q, a character string that represents the spoken content of the guide voice V by voice recognition of the audio signal SG supplied from the signal supply device 200.

Modification Mode 7

Figure 16:
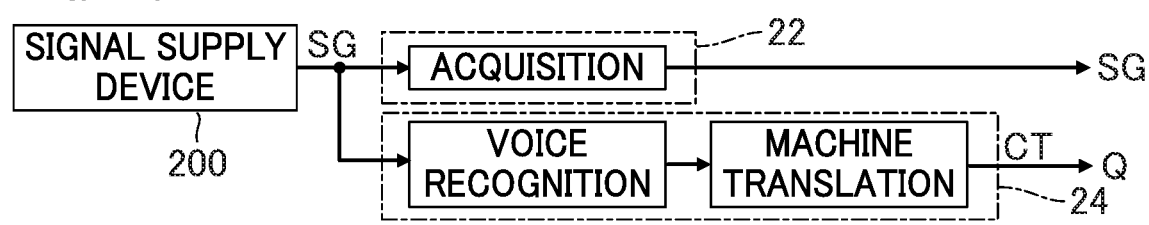
FIG. 16 is a diagram depicting a configuration of a modification (Mode 7) of the audio signal acquisitor and the related information acquisitor.

In mode 7 illustrated in the example in FIG. 16, the audio signal acquisitor 22 of the information management system 14 acquires the audio signal SG of the guide voice V in the first language from a signal supply device 200, in a manner similar to that employed in mode 6. The related information acquisitor 24 generates, as in mode 6, a character string of the guide voice V by voice recognition of the audio signal SG and generates, by machine translation of this character string, a translated character string CT representing the guide voice V in the second language as the related information Q. Any publicly known technique can be used for carrying out the machine translation. In other words, in mode 7, in parallel with the reproduction of the guide voice V in the first language by the sound emitting system 16, the translated character string CT showing the second-language translation of the guide voice V is displayed on the terminal device 12. Accordingly, there is no need for the administrator to separately specify this character string as the specified character string ST in the information management system 14, and moreover, the related information Q is generated by machine translation of the character string indicative of the spoken content of the guide voice V. Thus, an advantage is obtained in that there is no need to prepare, in advance, the related information Q in a language different from the language of the guide voice V.

In this mode, the step SA1 of the information generating process (FIG. 6) is understood to include: acquiring the audio signal SG of the guide voice V, the audio signal SG being supplied from the signal supply device 200; generating a character string representing the spoken content of the guide voice V by voice recognition of the audio signal SG supplied from the signal supply device 200; and generating the related information Q indicative of the translation of the guide voice V by machine translation of the generated character string (i.e., generating, as the related information Q, a character string derived from the translation of the spoken content of the guide voice V into the second language).

Figure 17:
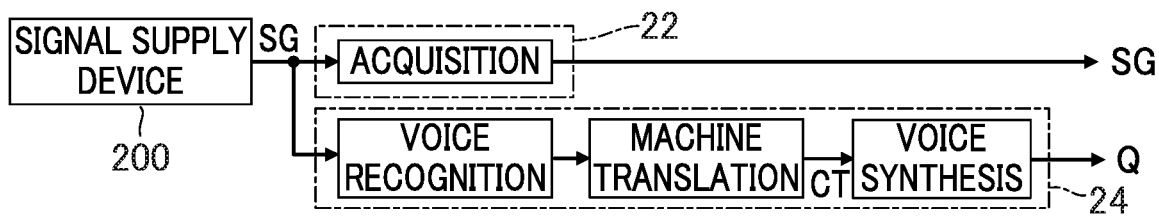
FIG. 17 is a diagram depicting a configuration of a further modification of the modification (Mode 7) of the audio signal acquisitor and the related information acquisitor.

As illustrated in the example in FIG. 17, an audio signal of the second-language guide voice V may be generated as the related information Q by voice synthesis from the translated character string CT generated by machine translation. In parallel with the emission of the guide voice V, the second-language guide voice V is reproduced on the terminal device 12, the second language being different from the first language, which is the original language of the guide voice V. Thus, an advantage is obtained in that even when the user of the terminal device 12 is unable to understand the guide voice V in the first language, the user is able to understand the reproduced content by listening to the guide voice V in the second language.

In this case, the step SA1 in FIG. 6 is understood to include: acquiring the audio signal SG of the guide voice V, the audio signal SG being supplied from the signal supply device 200; generating a character string that represents the spoken content of the guide voice V by voice recognition of the audio signal SG supplied from the signal supply device 200; generating a translated character string CT indicative of the translation of the guide voice V by machine translation of the generated character string; and generating an audio signal indicative of a vocal sound that is a spoken rendition of the translated character string CT by voice synthesis.

Figure 18:
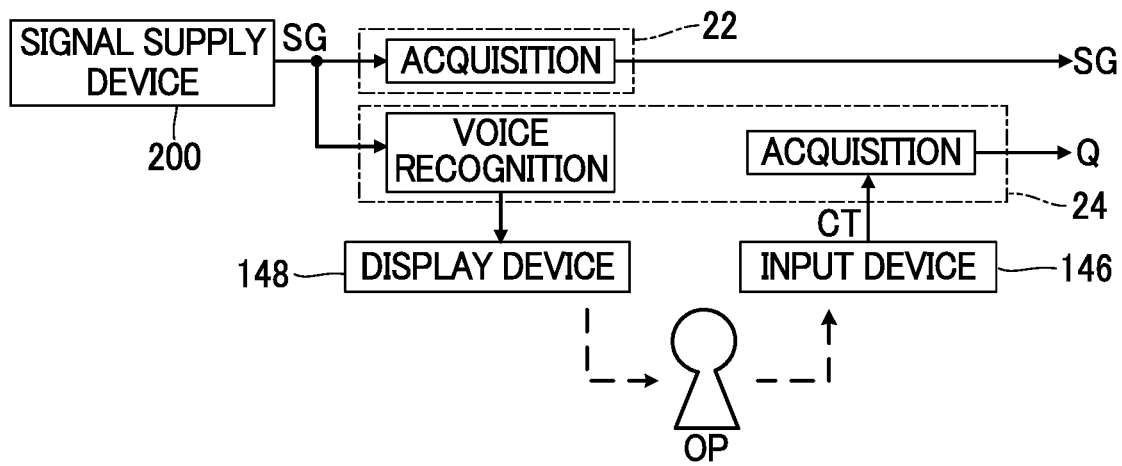
FIG. 18 is a diagram depicting a configuration of a further modification of the modification (Mode 7) of the audio signal acquisitor and the related information acquisitor.

In one configuration, namely, the example configuration shown in FIG. 18, in which an administrator OP, after referring to a first-language character string generated by voice recognition of the audio signal SG on the display device 148, gives by appropriately operating the input device 146 an instruction with regard to the written second-language translation of the guide voice V (i.e., a character string showing the translation carried out by the administrator OP himself/herself), the related information acquisitor 24 acquires as the related information Q the second-language translated character string CT specified by the administrator. In this mode, the related information acquisitor 24 acquires, as the related information Q, the translated character string CT indicative of the result of the administrator OP carrying out manual translation of the first-language character string. Accordingly, compared with a case in which a translated character string CT is generated by machine translation, it is possible to acquire a written second-language translation of the guide voice V, the translation being of a higher quality.

In this case, the step SA1 in FIG. 6 is understood to include: acquiring the audio signal SG of the guide voice V, the audio signal SG being provided from the signal supply device 200; and acquiring, as the related information Q, a character string indicative of the translation of the guide voice V, the character string being specified by an operation performed on the input device 146 for a character string that represents the spoken content of the guide voice V and is generated by voice recognition of the audio signal SG supplied from the signal supply device 200 (i.e., acquiring a character string derived from the translation of the spoken content of the guide voice V into the second language).

Figure 19:
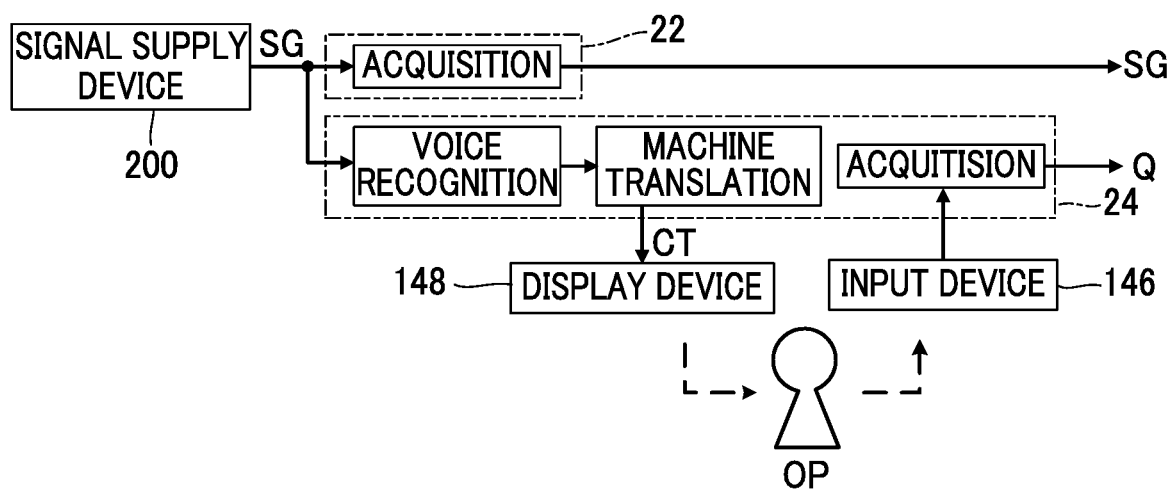
FIG. 19 is a diagram depicting a configuration of a further modification of the modification (Mode 7) of the audio signal acquisitor and the related information acquisitor.

As illustrated in the example in FIG. 19, after the second-language translated character string CT that is generated by machine translation as in mode 7 in FIG. 16 is displayed on the display device 148, the related information acquisitor 24 may, as the related information Q, acquire the result of the administrator OP editing (typically, correcting) the translated character string CT by operating the input device 146. In this mode, the content resulting from the administrator OP editing the second-language translated character string CT generated by machine translation is acquired as the related information Q. Thus, an advantage is obtained in that compared with a mode in which a character string indicative of the translation of the guide voice V is generated by machine translation alone, a written translation of a higher quality can be acquired. There is also an advantage in that, compared with a case in which a written translation by manual translation alone is acquired, an amount of work required of the administrator OP can be reduced and the related information Q can be acquired more rapidly.

In this case, the step SA1 in FIG. 6 is understood to include: acquiring the audio signal SG of the guide voice V, the audio signal SG being supplied from the signal supply device 200; generating a character string that represents the spoken content of the guide voice V generated by voice recognition of the audio signal SG supplied from the signal supply device 200; generating, by machine translation of the generated character string, a translated character string CT indicative of the translation of the guide voice V; and acquiring, as the related information Q, a character string indicative of the translation of the guide voice V, the character string having been edited by an operation on the input device 146 (i.e., acquiring a character string derived from translation of the spoken content of the guide voice V into the second language).

The character string derived from the translation of the spoken content of the guide voice V into the second language is thus understood to encompass, for example: the translated character string CT that is specified (mode 2 (FIG. 11)); the translated character string CT generated by machine translation (mode 3 (FIGS. 12, 16, and 17)); the translated character string generated by manual translation (mode 7 (FIG. 18)); and the character string resulting from the editing of the translated character string CT generated by machine translation, the editing being done by an operation performed on the input device 146 (mode 7 (FIG. 19)).

Modification Mode 8

Figure 20:
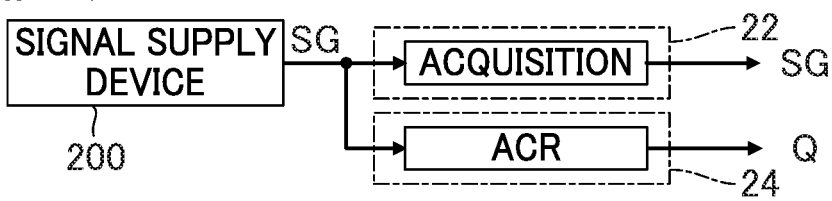
FIG. 20 is a diagram depicting a configuration of a modification (Mode 8) of the audio signal acquisitor and the related information acquisitor.

In mode 8 illustrated in the example in FIG. 20, the related information acquisitor 24 of the information management system 14 acquires, as the related information Q, a content or content information (e.g., the name of a content) that is related to the audio signal SG by automatic content recognition (ACR) of the audio signal SG. Any appropriate technique can be used at will to carry out automatic content recognition. For example, the related information acquisitor 24 analyzes a feature of the audio signal SG (e.g., MFCC, fundamental frequency, etc.), and as the related information Q, searches for and acquires a content corresponding to the feature of the audio signal SG from among contents prepared in advance. A fingerprinting technique that analyzes and collates features of audio signals SG or an audio watermarking technique that embeds information in audible frequency bands or in non-audible frequency bands of audio signals SG can be applied to the automatic content recognition in FIG. 20. In this mode, since the automatic content recognition is used to acquire the related information Q, the user of the terminal device 12 can be directed to a variety of information that relates to the guide voice V (e.g., information on services derived from the guide voice V) with a simple configuration.

In this mode of the information generating process (FIG. 6), the step SA1 is understood to include: acquiring the audio signal SG of the guide voice V, the audio signal SG being supplied from the signal supply device 200; and acquiring, as the related information Q, a content that is related to the audio signal SG supplied from the signal supply device 200.

Figure 21:
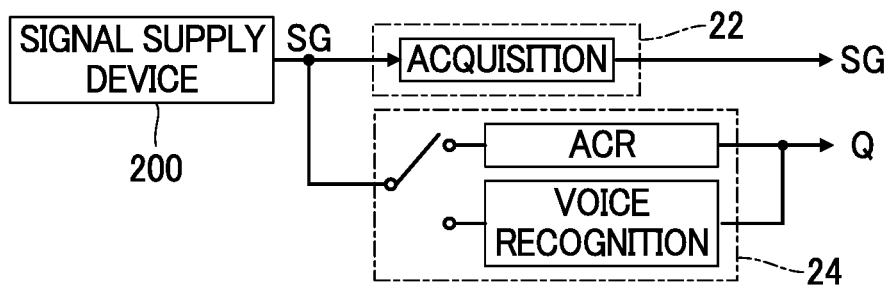
FIG. 21 is a diagram depicting a configuration of a further modification of the modification (Mode 8) of the audio signal acquisitor and the related information acquisitor.
Figure 22:
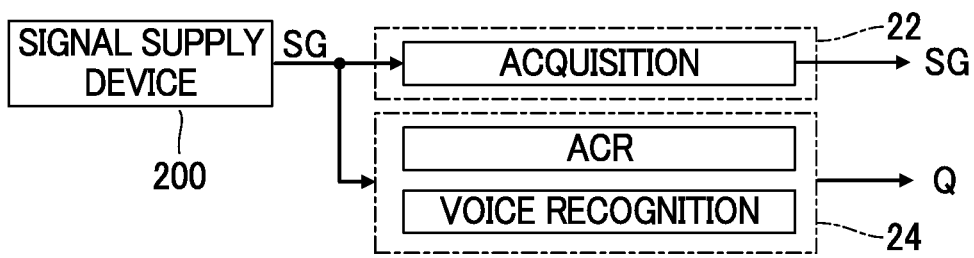
FIG. 22 is a diagram depicting a configuration of a further modification of the modification (Mode 8) of the audio signal acquisitor and the related information acquisitor.

The related information acquisitor 24 may selectively execute the voice recognition and the automatic content recognition to acquire the related information Q (FIG. 21). For example, either the voice recognition or the automatic content recognition is selected depending on the type of the guide voice V represented by the audio signal SG. Specifically, when the sound of the audio signal SG is a spoken sound made by a human (a voice), the related information acquisitor 24 generates the related information Q by voice recognition of the audio signal SG. When the sound of the audio signal SG is music (e.g., a singing voice, a sound of a musical instrument being played, etc.), the related information acquisitor 24 acquires the related information Q by automatic content recognition of the audio signal SG. The related information acquisitor 24 may use the voice recognition and the automatic content recognition together (FIG. 22). For example, a configuration is envisaged in which the related information acquisitor 24 acquires the related information Q by automatic content recognition of a character string resulting from voice recognition of the audio signal SG; or in which the related information acquisitor 24 acquires, as the related information Q, a character string resulting from voice recognition of the content identified by the automatic content recognition.

In modes 6 to 8, in a configuration that uses, as the signal supply device 200, a sound receiving device that receives the guide voice V emitted from a sound source (e.g., a speaker) to generate the audio signal SG or a communication device that receives the audio signal SG generated by a sound receiving device from the communication network 18, it is possible to provide the terminal device 12 with the related information Q in real time in parallel with the sound source emitting the guide voice V and in parallel with the sound emitting system 16 reproducing the guide voice V. In modes 6 to 8, it is assumed that audio signals SG are supplied from the signal supply device 200. However, audio signals SG of guide voices V may be generated by any one of various voice synthesis techniques, and related information Q may be generated by voice recognition of these audio signal SG.

Other Modifications

A manner in which the audio signal acquisitor 22 acquires audio signals SG and a manner in which the related information acquisitor 24 acquires related information Q are not limited to the above examples. For example, the related information acquisitor 24 may, by machine translation of the specified character string ST in the first language, generate a translated character string CT in the second language as the related information Q. The audio signal acquisitor 22 may, by voice synthesis from the translated character string CT generated by machine translation, generate the audio signal SG of the guide voice V in the second language.

As will be understood from the above examples, the audio signal acquisitor 22 is comprehended as an element that acquires audio signals SG of guide voices V. The concept of the audio signal acquisitor 22 includes an element that generates audio signals SG by way of audio processing, such as voice synthesis, and an element that acquires audio signals SG from an external device, such as the signal supply device 200 in FIG. 13. Similarly, the related information acquisitor 24 is comprehended as an element that acquires related information Q that is related to a guide voice V. The concept of the related information acquisitor 24 includes: an element that generates related information Q by way of information processing, such as voice recognition, machine translation, or voice synthesis, or a combination of at least two of these processes; an element that acquires from an external device related information Q, such as character strings (specified character strings ST or translated character strings CT) or images related to guide voices V; and a combination of these two elements.

Second Embodiment

A second embodiment of the present invention will now be described below. In each of the modes described below as examples, for elements whose operations or functions are similar to those in the first embodiment, like reference signs are used as in the first embodiment, and detailed descriptions thereof are omitted as appropriate.

Figure 23:
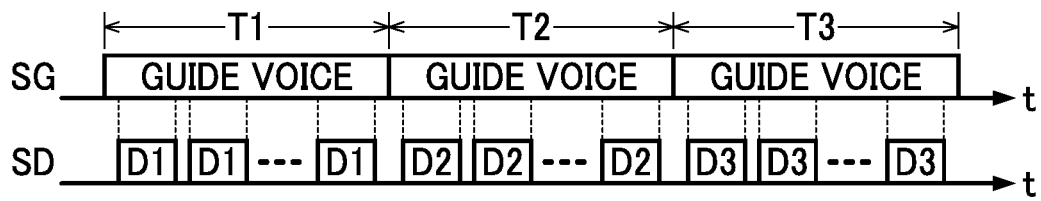
FIG. 23 is a diagram illustrating an operation of a signal processor according to a second embodiment.

FIG. 23 is a diagram describing a process for generating audio signals S in the signal processor 32 of the information management system 14 in the second embodiment. As shown in the example in FIG. 23, sections T with different positions along the time axis (hereinafter referred to as "reproduction sections") are assigned to an audio signal SG of a guide voice V acquired by the audio signal acquisitor 22. Specifically, the audio signal SG is divided into reproduction sections T (T1, T2, etc.) according to the content of the guide voice V (its purpose or target). For example, when the guide voice V includes scenes with different targets on which guidance is to be provided, the audio signal SG is divided into reproduction sections T according to the scene. The starting points or the end points of the reproduction sections T (borders between neighboring reproduction sections T) are typically specified according to an operation performed on the input device 146 by an administrator. Alternatively or additionally, mute sections in the audio signal S may serve as borders that define the reproduction sections T. There may be intervals set at will between neighboring sections along the time axis. Although the time length of each reproduction section T is equal in FIG. 23 for descriptive purposes, the time length of each reproduction section T may be different from one another.

The identification information setter 26 of the second embodiment assigns different pieces of identification information D (D1, D2, etc.) to the reproduction sections T of the audio signal SG. The signal processor 32 adds the different pieces of identification information D assigned by the identification information setter 26 to the reproduction sections T of the audio signal SG. In other words, as shown in the example in FIG. 23, the signal processor 32 generates an audio signal S by repeatedly adding, to each reproduction section T of the audio signal SG, a modulated signal SD of the piece of identification information D that the identification information setter 26 has assigned to the reproduction section T. That is, at multiple time points in a reproduction section T of the guide voice V, a sound component of the piece of identification information D of this reproduction section T is repeatedly mixed. The audio signal S generated by the signal processor 32 is transferred to the sound emitting system 16 as in the first embodiment.

The related information acquisitor 24 of the second embodiment acquires a piece of related information Q for each reproduction section T of the audio signal SG. For example, the related information acquisitor 24 generates a piece of related information Q indicative of a translated character string CT in the second language for each reproduction section T by dividing a specified character string ST according to the reproduction sections T of the guide voice V and executing machine translation for each reproduction section T. The association manager 34, for each reproduction section T of the guide voice V, associates the piece of identification information D assigned by the identification information setter 26 with the piece of related information Q acquired by the related information acquisitor 24. That is, the association manager 34 associates the piece of identification information D for each reproduction section T assigned by the identification information setter 26 with the piece of related information Q acquired for that reproduction section T by the related information acquisitor 24, and store them in the storage device 144.

The sound emitting devices 166 of the sound emitting system 16 emit sounds corresponding to audio signals S transferred from the information management system 14 as in the first embodiment. In parallel with the reproduction of the guide voice V corresponding to the audio signal SG, the sound of the piece of identification information D for each reproduction section T of the audio signal SG is repeatedly emitted, pieces of identification information D differing from one another between the reproduction sections T. Accordingly, every time the reproduction point of the guide voice V changes from one reproduction section T to the next reproduction section T, the piece of identification information D notified to a terminal device 12 changes. The information extractor 51 of the terminal device 12 sequentially extracts the pieces of identification information D of the reproduction sections T of the guide voice V from received-audio signals X. For each extraction of the piece of identification information D (for each reproduction section T), an information request R specifying the piece of identification information D is transmitted by the transmitter 542 and the piece of related information Q corresponding to the information request R is acquired by the acquisitor 544. Accordingly, the pieces of related information Q that the output device 58 outputs change sequentially with progression of the reproduction of the guide voice V. Specifically, after one reproduction section T of the guide voice V has started (after transition from one reproduction section T to the next reproduction section T), a content (a piece of related information Q) outputted by the output device 58 changes.

The second embodiment achieves advantageous effects similar to those of the first embodiment. In the second embodiment, for each of the reproduction sections T, which are time-axis divided sections of the guide voice V, a piece of identification information D is assigned and the piece of identification information D and a corresponding piece of related information Q are associated with each other. It is thus possible to change the related information Q presented to the user of the terminal device 12 in conjunction with the progression of the reproduction of the guide voice V.

Third Embodiment

Figure 24:
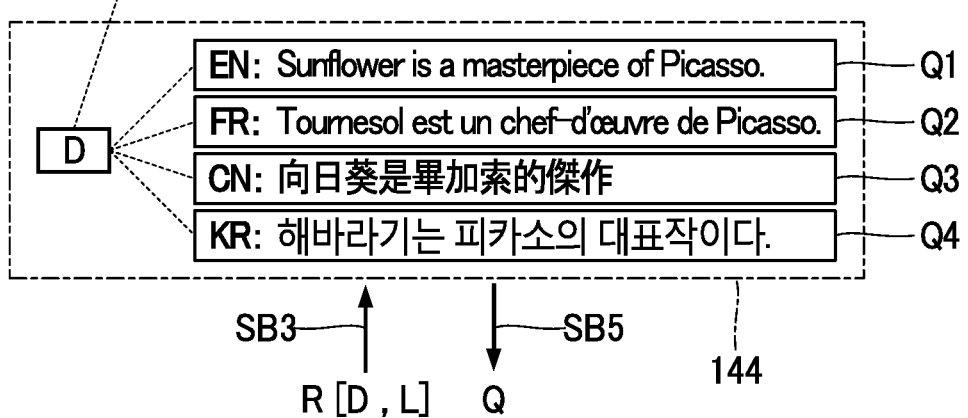
FIG. 24 is a diagram illustrating an operation of an information provider according to a third embodiment.

FIG. 24 is a diagram describing an operation in a third embodiment of the present invention. As shown in the example in FIG. 24, the storage device 144 of the information management system 14 in the third embodiment stores multiple (N number of) pieces of related information Q (Q1, Q2, etc.) for each piece of identification information D of a guide voice V represented by an audio signal SG. Specifically, N pieces of related information Q are each associated with one piece of identification information D of the guide voice V and are stored, the N pieces of related information Q representing vocal sounds that are spoken rendition of character strings that each represent the guide voice V, which is originally in the first language, in different languages other than the first language. A manner in which the N pieces of related information Q in different languages are prepared can be freely chosen. For example, as in the example in FIG. 12 referred to above, N numbers of translated character strings CT in different languages may first be generated by the machine translation of a specified character string ST in the first language. With the voice synthesis from the generated translated character strings CT, the N pieces of related information Q representing guide voices V in N types of languages may then be generated. Alternatively, as in the example in FIG. 17 referred to above, a character string of the guide voice V may be generated by voice recognition of the audio signal SG of the guide voice V, the audio signal SG being provided from the signal supply device 200. Then, with the machine translation of the generated character string, N number of translated character strings CT in different languages may be generated. With the voice synthesis from the generated translated character strings CT, the N pieces of related information Q representing the guide voices V in N types of languages may then be generated.

After the information extractor 51 extracts identification information D from a received-audio signal X derived from a sound that is emitted by the sound emitting system 16 and is then received, the transmitter 542 of a terminal device 12 transmits, to the information management system 14, an information request R including the identification information D and language information L (SB3). The language information L is information specifying a language used in the terminal device 12. A manner in which the language information L is acquired can be chosen at will. For example, a configuration may be used in which the transmitter 542 generates the language information L by referring to a language setting in the operating system (OS) of the terminal device 12. In this case, an advantage is obtained in that the user need not specify the language. Alternatively, a configuration may be used in which the language information L is generated indicative of a language that the user of the terminal device 12 has specified as he/she wishes.

After receiving the information request R from the terminal device 12, the information provider 36 of the information management system 14 selects, from among the N pieces of related information Q that are each associated with the piece of identification information D specified in the information request R and that are stored in the storage device 144, a piece of related information Q in the language indicated by the language information L specified in the information request R (SB4), and transmits this piece of related information Q to the request-source terminal device 12 (SB5). The acquisitor 544 of the terminal device 12 acquires the piece of related information Q transmitted from the information management system 14 (SB6), and the output device 58 (a sound emitting device 166) emits the guide voice V indicated by the piece of related information Q for presentation to the user (SB7). As is understood from the above description, in parallel with the reproduction of the guide voice V in the first language, the guide voice V in the language specified by the language information L is outputted from the output device 58 of the terminal device 12, the specified language being one from among the N languages and being other than the first language. Accordingly, compared with a configuration in which the related information Q is outputted after the reproduction of the guide voice V, for example, an advantage is obtained in that it is easy for the user to recognize the association between the guide voice V and the related information Q.

The third embodiment achieves advantageous effects similar to those of the first embodiment. Furthermore, since one of the N pieces of related information Q in different languages is selectively provided to the terminal device 12 in the third embodiment, an advantage is obtained in that it is possible to provide each of a variety of users who use their respective languages with a piece of related information Q that is in a language comprehensible to the user. In the above description, an example is given where pieces of related information Q represent voices in different languages. Alternatively, a configuration may be used in which pieces of related information Q are representative of character strings (translated character strings CT) that in turn represent the guide voice V in different languages. In this case, a manner in which pieces of related information Q are generated can be chosen at will. As in the example shown in FIG. 16, N number of translated character strings in N different languages can be generated as N pieces of related information Q by machine translation of the character string in the first language, the character string being generated by voice recognition of the audio signal SG of the guide voice V supplied from the signal supply device. In a configuration in which related information Q represents a character string, the output device 58 (display device) of the terminal device 12 displays this character string to present the related information Q to the user. In this case, other than the generation method shown as an example in FIG. 16, the generation (acquisition) method shown in FIG. 11 (a configuration to acquire an inputted translated character string CT), FIG. 18 (a configuration to acquire a character string indicating a translation performed by the administrator OP himself/herself), or FIG. 19 (a configuration to acquire a character string resulting from the administrator OP editing a translated character string CT generated by the machine translation) may be used. The configuration of the second embodiment is applicable to the third embodiment.

Modifications

Each of the modes given as examples above may be modified in various ways. Described below are some example modifications. At least two modes selected at will from the following examples may, as appropriate, be combined so long as they do not conflict with each other.

(1) In the above-mentioned modes, examples of a configuration are shown in which every time a sound of a piece of identification information D is received (every time the user moves closer to an exhibit), the terminal device 12 acquires a piece of related information Q corresponding to the piece of identification information D. Alternatively, the association manager 34 may associate multiple pieces of related information Q corresponding to different exhibits in the exhibition facility M with only one piece of identification information D, and when the terminal device 12 receives a sound of the piece of identification information D transmitted from a sound emitting device 166 of the sound emitting system 16, the terminal device 12 may collectively acquire the multiple pieces of related information Q corresponding to the piece of identification information D from the information provider 36. For example, at a point when the user of the terminal device 12 enters into a particular exhibition facility M or when the user first acquires a piece of identification information D in an exhibition facility M, the terminal device 12 may collectively acquire multiple pieces of related information Q concerning exhibits in the exhibition facility M.

In the techniques in Patent Documents 1 and 2, multiple pieces of information stored in advance in a terminal device carried by a user (a reproducing unit in Patent Document 1 or a portable transceiving means in Patent Document 2) are selectively reproduced. Thus, a problem arises in that, when there is a need to update information, the information is required to be updated separately in each terminal device. In a configuration according to the present mode of modification, related information Q stored in the storage device 144 of the information management system 14 is provided to terminal devices 12. Accordingly, with the related information Q stored in the storage device 144 being updated, the updated related information Q can be provided to each terminal device 12. Thus, an advantage is obtained in that the related information Q does not need to be updated separately for each terminal device 12.

(2) Contents of related information Q are not limited to the examples shown in the modes described above. For example, the information provider 36 may provide the terminal device 12 with, as the related information Q, a combination of at least two among a sound, an image, and a character string, which are shown as examples of related information Q in the above modes. Alternatively or additionally, for example, the information provider 36 may provide the terminal device 12 with, as the related information Q, link information (e.g., URL) indicative of a location of information related to the guide voice V (e.g., related information Q shown in the above modes).

(3) In the second embodiment, as described with reference to FIG. 23, an example configuration is shown in which each of multiple pieces of identification information D (D1, D2, D3, etc.) corresponding to different reproduction sections T of the guide voice V is transmitted repeatedly multiple times to the terminal device 12 in the corresponding reproduction section T. In this configuration, in a case where the terminal device 12 acquires, for example, identification information D1 that is transmitted at a point close to the end of a reproduction section T1 and identification information D2 that is transmitted at a point close to the beginning of the next reproduction section T2, there is a possibility that the terminal device 12 will acquire related information Q corresponding to the identification information D2 in the middle of related information Q corresponding to the identification information D1 being reproduced. In such a situation, it is preferable that the terminal device 12 stop reproducing the related information Q corresponding to the identification information D1 in the middle (at the point that the related information Q corresponding to the identification information D2 is acquired), and then starts to reproduce the related information Q of the identification information D2. Alternatively, each piece of identification information D may be transmitted to the terminal device 12 only during a period in the beginning (e.g., the first-half period) of the corresponding reproduction section T, such that between multiple pieces of related information Q corresponding to different pieces of identification information D, periods of reproduction thereof by the terminal device 12 do not overlap with each other.

A configuration may be used in which, in a case where the terminal device 12 acquires the related information Q of the identification information D2 in the middle of reproducing the related information Q corresponding to the identification information D1, as in the above example, the terminal device 12 starts to reproduce the related information Q of the identification information D2 after completing reproduction of the related information Q of the identification information D1. Alternatively, in a case where the terminal device 12 acquires the related information Q of the identification information D2 in the middle of reproducing the related information Q corresponding to the identification information D1, an operation performed by the user may serve as a trigger for the terminal device 12 to commence reproduction of the related information Q of the identification information D2, thereby causing reproduction of the related information of the identification information D1 to be stopped in the middle. For example, a "next" button is displayed after the related information Q corresponding to the identification information D2 is acquired, and after the user operates this button, the terminal device 12 commences reproducing the related information Q of the identification information D2.

(4) A manner of outputting (e.g., a manner of displaying) related information Q can be chosen at will. For example, in a configuration in which the terminal device 12 includes, for example, an image-taking device (not shown in the figures) that takes images (still and/or moving), an image taken by the image-taking device and an image indicated by related information Q (a still image, a moving image, a character string, etc.) may be synthesized and displayed on the display device of the output device 58.

Figure 25:
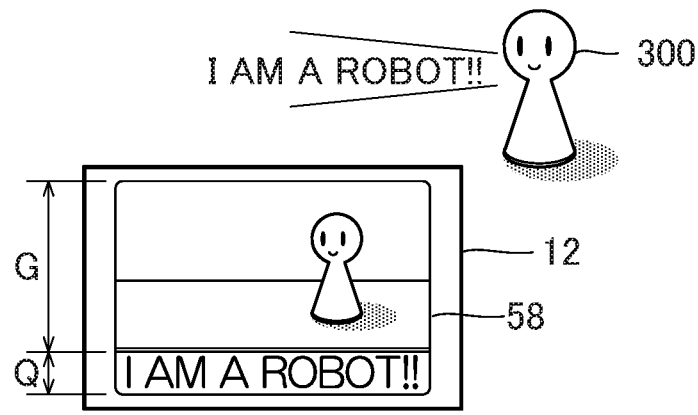
FIG. 25 depicts an example of display of related information according to one modification.

For example, as shown in FIG. 25, a situation is envisaged in which a robot 300 is exhibited as an exhibit in the exhibition facility M such as a museum, the robot 300 carrying a sound-emitting function emitting a variety of sounds for reproduction, such as a guide voice. The storage device 144 of the information management system 14 stores an audio signal S that includes an audio signal SG of a sound for reproduction and a modulated signal SD of identification information D. Related information Q in the form of a character string representing a spoken content of the sound for reproduction is associated with the identification information D and is stored in the storage device 144. As shown in the example in FIG. 25, the control device 50 of the terminal device 12 causes an image G of the robot 300 (typically, a moving image) taken by the image-taking device and a character string that is the related information Q provided from the information management system 14 to be displayed together (overlay-displayed) on the display device of the output device 58 in real time.

In a configuration in which related information Q alone is displayed on the display device, the user will need to frequently switch his/her gaze between an image displayed on the display device (related information Q) and the robot 300, which is an exhibit in reality. In the configuration that is described with reference to FIG. 25, the image G and the related information Q are displayed together on a single display screen. Thus, there is an advantage that the user does not need to frequently switch his/her gaze between the display device and the robot 300. In particular, in a configuration in which the character string of the sound for reproduction is displayed along with the image G, an additional advantage can be realized in that a hard-of-hearing person, for example, is readily able to view the movement of the robot 300 and the content of the sound for reproduction.

(5) In the modes described above, the information providing system 10 is used as a guide in the exhibition facility M. A situation in which the information providing system 10 is used is not limited to the above example. For example, the information providing system 10 can be used to provide voice guidance in a transport system, such as in trains or buses. Specifically, a vehicle such as a train or a bus is equipped with a sound emitting system 16, and an audio signal S is generated by an information management system 14 and then transferred to the sound emitting system 16, the audio signal S resulting from an audio signal SG of a guide voice V that provides guidance on vehicle stops, for example, train stations or bus stops, with identification information D added thereto. When the vehicle moves closer to a stop, an audio signal S corresponding to the stop is provided to the sound emitting devices 166 of the sound emitting system 16, and a guide voice V announcing the vehicle's arrival at the stop is emitted along with the identification information D. A terminal device 12 in the vehicle outputs related information Q from the output device 58, the related information Q being provided from the information management system 14 in response to an information request R including the identification information D. Examples of information that can be prepared as the related information Q include: a voice indicative of the second-language translation of the guide voice V that is originally in the first language, as described in the above modes; and a voice or an image (still or moving) that indicates tourist information on areas of note around the stop.

(6) The modes described above provide example configurations in which audio signals S, each of which includes an audio signal SG of a sound for reproduction and a modulated signal SD of a piece of identification information D, and a corresponding piece of related information Q for each piece of identification information D, are stored in the storage device 144. In this configuration, an audio signal SG and related information Q that each correspond to a common guide voice V are associated with each other by the corresponding identification information D. Specific ways in which an audio signal SG and related information Q are associated with each other can be adapted as appropriate. For example, there can be envisaged a configuration in which auxiliary information that specifies a location and a time, or ranges of each, for provision of related information Q is associated with the related information Q and stored in the storage device 144. The auxiliary information may specify, for example, a location and a time at which the corresponding audio signal SG is to be reproduced. The terminal device 12 transmits to the information management system 14 an information request R that includes the time and location information of the terminal device 12 detected by a location detecting means, such as Global Positioning System (GPS). The information provider 36 of the information management system 14 selects, from among multiple pieces of related information Q stored in the storage device 144, a piece of related information Q corresponding to each of a time and location that are respectively close to the time and the location information specified in the information request R (SB4), and thereafter transmits the selected piece of related information Q to the request-source terminal device 12 (SB5). In this configuration, without need for identification information D, it is possible to provide the terminal device 12 with the related information Q corresponding to the audio signal SG, as in the modes described above.

(7) In the modes described above, a sound of the audio signal S that includes the audio signal SG of the guide voice V and the modulated signal SD of the identification information D is emitted from a sound emitting device 166. A manner in which the terminal device 12 is notified of the identification information D upon emission of the guide voice V, is not limited to the above example. For example, it is possible to identify the identification information D from a feature of the received-audio signal X derived from a received sound of the guide voice V (a feature substantially of the audio signal SG). More specifically, as in the example shown in FIG. 26, a matcher 15 is added to an information providing system 10 similar to that in the modes described above. The matcher 15 is realized by a server that is capable of communicating with the terminal device 12 via the communication network 18, for example. The matcher 15 has a search table TBL where pieces of recognition information W (W1, W2, etc.) representing features of audio signals SG of guide voices V emitted from sound emitting devices 166 of the sound emitting system 16 and pieces of identification information D (D1, D2, etc.) of the guide voices V are associated with each other.

Figure 26:
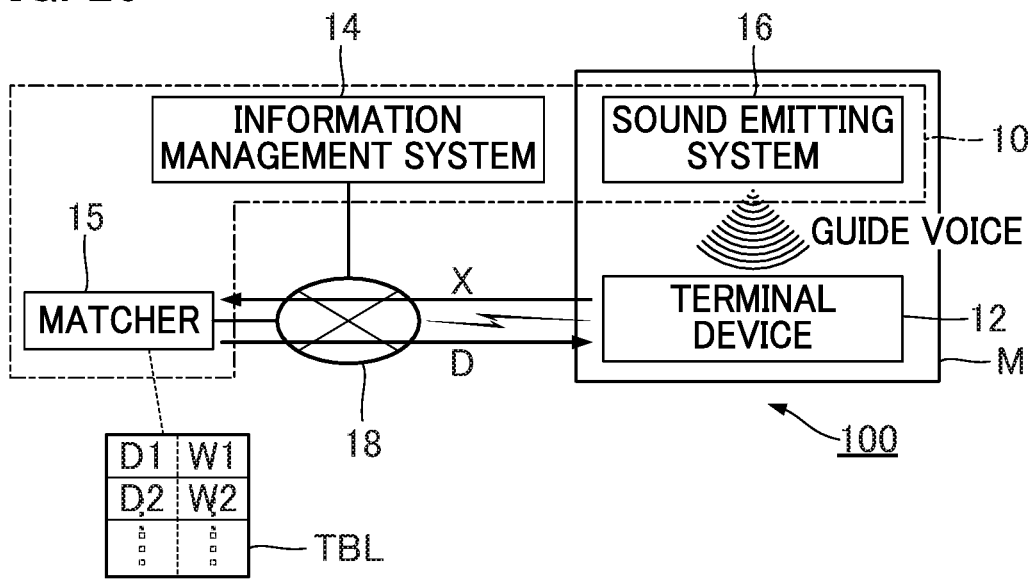
FIG. 26 is a diagram depicting a configuration of a communication system according to one modification.

In the configuration shown in FIG. 26, a sound emitting device 166 of the sound emitting system 16 emits a guide voice V represented by an audio signal SG but does not emit a sound component of the identification information D. The control device 50 of the terminal device 12 stores in the storage device 52 a received-audio signal X of the guide voice V, the received-audio signal X being derived from a sound received by the sound receiving device 56, for a specified length of time (e.g., several seconds), following which the transmitter 542 of the communication device 54 transmits the received-audio signal X to the matcher 15. That is, the terminal device 12 refers to the matcher 15 for the identification information D of the guide voice V received by the sound receiving device 56.

The matcher 15 analyzes the feature of the received-audio signal X received from the terminal device 12 via the communication network 18, and searches the search table TBL for a piece of recognition information W having a feature that is similar to or that matches the analyzed feature. A manner in which a search for the recognition information W is conducted can be chosen at will. For example, use of automatic content recognition technology is preferable. The matcher 15 acquires a piece of identification information D corresponding to the searched piece of recognition information W from the search table TBL and transmits the acquired information to the terminal device 12. Accordingly, the identification information D of the guide voice V emitted from the sound emitting device 166 is notified to the terminal device 12. The operation by which the terminal device 12 acquires, from the information management system 14, a piece of related information Q corresponding to the piece of identification information D notified from the matcher 15 is similar to that described in the modes set out above.

Although the recognition information W representing a feature of the audio signal SG is given as an example in the above description, the content of the recognition information W can be changed as appropriate. For example, the audio signal SG itself (e.g., waveform data) can be recorded in the search table TBL as a piece of recognition information W. The matcher 15 searches the search table TBL for a piece of recognition information W of a waveform that is similar to or that matches the received-audio signal X received from the terminal device 12. The matcher 15 may be included either in the information management system 14 or in the terminal device 12.

In the configurations of the above modes in which the terminal device 12 is notified of the identification information D by sound communication in parallel with emission of the guide voice V, it is necessary to provide the sound emitting devices 166 capable of reproducing the frequency band (e.g., 18 kHz or more and 20 kHz or less) of the modulated signal SD in which the identification information D is included. In the configuration shown in FIG. 26, an advantage exists in that the terminal device 12 can be notified of the identification information D regardless of the band that the sound emitting devices 166 can reproduce. Accordingly, the configuration in FIG. 26 is preferable for use in a situation where conventional sound emitting devices 166 are used that are not capable of reproducing a high pitch audible frequency band. In a configuration in which the terminal device 12 is notified of the identification information D by sound communication, advantages exist in that the terminal device 12 need not transmit the received-audio signal X to the matcher 15, whereby an amount of communication is reduced, and use of the matcher 15, which searches for the identification information D with the received-audio signal X, is unnecessary.

(8) The information management system 14 described in the modes set out above can be formed by use of an individual device or by multiple devices (servers) that are physically separate from each other. For example, a configuration can be employed in which the information management system 14 in the above modes is distributed to a first server including the identification information setter 26 and a second server including elements other than the identification information setter 26, the first server and the second server communicating with each other via, for example, the communication network 18. As will be apparent from the foregoing description, the information providing system 10 of the present invention encompasses both an individual device and an aggregate of devices. Moreover, the entire information providing system 10, including the information management system 14 and the sound emitting system 16, can be formed from a single device.

(9) Although reproduction of guide voices V for providing guidance in the exhibition facility M is shown as an example in the modes set out above, types of sounds that the sound emitting devices 166 of the sound emitting system 16 may emit are not limited to guide voices V. For example, the modes set out above can be used for reproduction of a variety of sounds, such as music. As will also be apparent from the above description, audio signals SG in the modes set out above can be collectively expressed as signals that indicate sounds to be reproduced (sounds for reproduction).

(10) In the modes set out above, example configurations are shown in which the sound emitting devices 166 of the sound emitting system 16 emit sounds corresponding to audio signals S, each audio signal S including an audio signal SG representing a guide voice V and a modulated signal SD that includes identification information D. The reproduction of guide voices V (sounds for reproduction), however, can be omitted. Specifically, the signal processor 32 of the information management system 14 may transfer to the sound emitting system 16, as an audio signal S (an audio file), a modulated signal SD in which there is included the identification information D assigned by the identification information setter 26. The sound emitting system 16 emits the sound of the identification information D by providing the audio signal S to the sound emitting devices 166. The terminal device 12 extracts the identification information D from a received-audio signal X that is generated by the sound receiving device 56 receiving sounds emitted from the sound emitting system 16. The terminal device 12 then acquires, from the information provider 36 of the information management system 14, related information Q corresponding to the identification information D. As will be readily apparent from the above description, the sound receiving device 56 is collectively expressed as an element that generates received-audio signals X by receiving sounds emitted according to audio signals S that include modulated signals SD each including identification information D.

However, it is not stipulated whether the audio signals S include audio signals SG of guide voices V.

(11) In the modes set out above, sound communication is used to notify the terminal device 12 of identification information D. The communication scheme used to notify the terminal device 12 of identification information D is not limited to the above example. For example, wireless communication using infrared rays or radio waves (e.g., near field communication) can be used to notify the terminal device 12 of identification information D.

(12) Ways in which audio signals SG of guide voices are generated or in which related information Q is generated are not limited to the examples given in the above-described modes (FIG. 3, FIGS. 10 to 22). With regard to the third embodiment, as long as the information management system 14 includes the information provider 36 and the storage device 144, none of the audio signal acquisitor 22, the related information acquisitor 24, the identification information setter 26, the signal processor 32, and the association manager 34 are essential elements. Accordingly, a configuration can be employed in which a separate device includes these elements and causes the storage device 144 to store audio signals S and related information Q.

(13) In the above-described modes, the information management system, the sound emitting system, and the terminal device can each be accomplished by the control device and coordinating programs, or by the use of dedicated electronic circuitry. A program according to the present invention can be provided in the form of a computer-readable storage medium having the program stored thereon, and is installable in a computer. The storage medium may be, for example, a non-transitory storage medium, a good example of which is an optical storage medium (an optical disk) such as a CD-ROM. Examples of such a storage medium may also include any type of publicly known storage medium, such as a magnetic storage medium or a semiconductor storage medium. The program according to the present invention can be distributed through a communication network, and is installable in a computer.

DESCRIPTION OF REFERENCE SIGNS

100 . . . communication system; 10 . . . information providing system; 12 . . . terminal device; 14 . . . information management system; 142 . . . control device; 144 . . . storage device; 146 . . . input device; 148 . . . display device; 16 . . . sound emitting system; 162 . . . control device; 164 . . . storage device; 166 . . . sound emitting device; 18 . . . communication network; 22 . . . audio signal acquisitor; 24 . . . related information acquisitor; 26 . . . identification information setter; 32 . . . signal processor; 322 . . . demodulation processor; 324 . . . mixing processor; 34 . . . association manager; 36 . . . information provider; 50 . . . control device; 51 . . . information extractor; 52 . . . storage device; 54 . . . communication device; 542 . . . transmitter; 544 . . . acquisitor; 56 . . . sound receiving device; 58 . . . output device; 200 . . . signal supply device.

The invention claimed is:

1. An information management system comprising:
at least one processor; and
an information provider configured to communicate with a terminal device by means of a communication not involving communication in a form of sound waves, wherein the at least one processor is configured to execute stored instructions to:
acquire a first audio signal representative of a guide voice in a first language;
generate pieces of content information, where each piece of content information represents a spoken content of the guide voice and is a translation of the spoken content of the guide voice in a corresponding one of multiple languages other than the first language;
associate the pieces of content information generated for the guide voice in the multiple languages with a same piece of identification information;
transfer, to a sound emitting system including a speaker, a second audio signal that includes the first audio signal representative of the guide voice and a sound component indicative of the piece of identification information, wherein the sound emitting system is configured to output the second audio signal in a form of sound waves to a plurality of terminal devices that are present near the speaker and are each configured to extract the piece of identification information from the second audio signal; and
the processor is further configured to:
receive, by the information provider, from one of the terminal devices an information request including the piece of identification information extracted from the second audio signal and language information indicative of a second language, wherein the second language is one from among the multiple languages other than the first language, and is specified in the terminal device,
upon receipt of the information request,
select one of the pieces of content information that is associated with the piece of identification information included in the information request and that is also in the second language indicated by the language information in the information request; and
transmit, by the information provider, the selected piece of the content information to the terminal device having transmitted the information request to the information management system, so that the content information is presented to a user of the terminal device in the second language while the guide voice in the first language is being output by the speaker.

2. The information management system according to claim 1,
wherein,
the at least one processor is configured to execute stored instructions to:
in generating the first audio signal, add sound components indicative of pieces of identification information to reproduction sections that are time-axis divided sections of the acquired first audio signal, wherein the pieces of identification information in the sound components are different from one another between the reproduction sections, and
in associating the pieces of content information with the identification information, associate a piece of content information that is acquired for each reproduction section with a piece of identification information that corresponds to the reproduction section.

3. The information management system according to claim 1, wherein the at least one processor is configured to execute stored instructions to:
in acquiring the first audio signal, generate the first audio signal indicative of the guide voice by voice synthesis, the guide voice being a spoken rendition of a character string that accords with an instruction from a user.

4. The information management system according to claim 1, wherein the at least one processor is configured to execute stored instructions to:
in generating the content information, generate each piece of content information indicative of the translation of the spoken content of the guide voice by machine translation into a corresponding one of the multiple languages other than the first language, of a character string indicative of the spoken content of the guide voice.

5. The information management system according to claim 1, wherein the at least one processor is configured to execute stored instructions to:
in generating the content information, generate a character string indicative of the translation of the spoken content of the guide voice, by machine translation into a corresponding one of the multiple languages other than the first language, of a character string indicative of the spoken content of the guide voice, and further generate, as each piece of content information and by voice synthesis, an audio signal indicative of a spoken rendition of the character string indicative of the translation, the audio signal thus being indicative of the translation of the spoken content of the guide voice.

6. The information management system according to claim 1,
wherein the at least one processor is configured to execute stored instructions to:
in acquiring the first audio signal, acquire the first audio signal indicative of the guide voice, the first audio signal being supplied from a signal supply device, and
in generating the content information, generate, from the first audio signal supplied from the signal supply device, a character string indicative of the spoken content of the guide voice by voice recognition, and by machine translation into a corresponding one of the multiple languages other than the first language, of the generated character string, generate each piece of content information indicative of the translation of the spoken content of the guide voice.

7. The information management system according to claim 1,
wherein the at least one processor is configured to execute stored instructions to:
in acquiring the first audio signal, acquire the first audio signal indicative of the guide voice, the first audio signal being supplied from a signal supply device, and
in generating the content information,
generate, from the first audio signal supplied from the signal supply device, a character string indicative of the spoken content of the guide voice by voice recognition, and
generate a character string indicative of the translation of the spoken content of the guide voice by machine translation into a corresponding one of the multiple languages other than the first language, of the generated character string, and
further generate, as each piece of content information and by voice synthesis, an audio signal indicative of a spoken rendition of the character string indicative of the translation, the audio signal thus being indicative of the translation of the spoken content of the guide voice.

8. The information management system according to claim 1,
wherein the at least one processor is configured to execute stored instructions to:
in acquiring the first audio signal, acquire the first audio signal indicative of the guide voice, the first audio signal being supplied from a signal supply device, and
in generating the content information,
generate, from the first audio signal supplied from the signal supply device, a character string indicative of the spoken content of the guide voice by voice recognition; and
acquire, as each piece of content information, a character string that is indicative of a translation of the spoken content of the guide voice and is specified as a translation, in a corresponding one of the multiple languages other than the first language, of the generated character string by an operation performed on an input device.

9. The information management system according to claim 1,
wherein the at least one processor is configured to execute stored instructions to:
in acquiring the first audio signal, acquire the first audio signal indicative of the guide voice, the first audio signal being supplied from a signal supply device, and
in generating the content information,
generate, from the audio signal supplied from the signal supply device, a character string indicative of the spoken content of the guide voice by voice recognition, and
generate a character string indicative of the translation of the spoken content of the guide voice, by machine translation into a corresponding one of the multiple languages other than the first language, of the generated character string, and
acquire, as each piece of content information, a character string that is indicative of the translation of the spoken content of the guide voice and has been edited by an operation performed on an input device.

10. An information management method comprising:
acquiring a first audio signal representative of a guide voice in a first language;
generating pieces of content information, where each piece of content information represents a spoken content of the guide voice and is a translation of the spoken content of the guidance voice in a corresponding one of multiple languages other than the first language;
associating the pieces of content information generated for the guide voice in the multiple languages with a same piece of identification information;
transferring, to a sound emitting system including a speaker, a second audio signal that includes the first audio signal representative of the guide voice and a sound component indicative of the piece of identification information, wherein the sound emitting system is configured to output the second audio signal in a form of sound waves to a plurality of terminal devices that are present near the speaker and are each configured to extract the piece of identification information from the second audio signal;
receiving, by an information provider configured to communicate with the terminal devices by means of a communication not involving communication in a form of sound waves, from one of the terminal devices an information request including the piece of identification information notified to the terminal device and language information indicative of a second language, from among the multiple languages other than the first language, that is specified in the terminal device;
upon receipt of the information request, selecting one of the pieces of content information that is associated with the piece of identification information included in the information request and that is also in the second language indicated by the language information in the information request; and
transmitting, by the information provider, the selected piece of the content information to the terminal device having transmitted the information request to the information management system, so that the content information is presented to a user of the terminal device in the second language while the guide voice in the first language is being output by the speaker.

11. A non-transitory computer-readable storage medium having stored thereon a program executable by a computer to execute an information management method, the method comprising:
- acquiring a first audio signal representative of a guide voice in a first language;
- generating pieces of content information, where each piece of content information represents a spoken content of the guide voice and is a translation of the spoken content of the guidance voice in a corresponding one of multiple languages other than the first language;
- associating the pieces of content information generated for the guide voice in the multiple languages with a same piece of identification information;
- transferring, to a sound emitting system including a speaker, a second audio signal that includes the first acquired audio signal representative of the guide voice and a sound component indicative of the piece of identification information, wherein the sound emitting system is configured to output the second audio signal in a form of sound waves to a plurality of terminal devices that are present near the speaker and are each configured to extract the piece of identification information from the second audio signal;
- receiving, by an information provider configured to communicate with the terminal devices by means of a communication not involving communication in a form of sound waves, from one of the terminal devices an information request including the piece of identification information notified to the terminal device and language information indicative of a second language, from among the multiple languages other than the first language, that is specified in the terminal device;
- upon receipt of the information request, selecting one of the pieces of content information that is associated with the piece of identification information included in the information request and that is also in the second language indicated by the language information in the information request; and
- transmitting, by the information provider, the selected piece of the content information to the terminal device having transmitted the information request to the information management system, so that the content information is presented to a user of the terminal device in the second language while the guide voice in the first language is being output by the speaker.

* * * * *